United States Patent
Kyo et al.

(10) Patent No.: US 11,091,609 B2
(45) Date of Patent: Aug. 17, 2021

(54) MODIFIED CONJUGATED DIENE-BASED POLYMER, PRODUCTION METHOD THEREOF, RUBBER COMPOSITION AND TIRE

(71) Applicant: Asahi Kasei Kabushiki Kaisha, Tokyo (JP)

(72) Inventors: Miki Kyo, Tokyo (JP); Kenta Hisamura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 248 days.

(21) Appl. No.: 16/326,533

(22) PCT Filed: Aug. 9, 2017

(86) PCT No.: PCT/JP2017/029013
§ 371 (c)(1),
(2) Date: Feb. 19, 2019

(87) PCT Pub. No.: WO2018/034217
PCT Pub. Date: Feb. 22, 2018

(65) Prior Publication Data
US 2019/0203021 A1    Jul. 4, 2019

(30) Foreign Application Priority Data

Aug. 19, 2016 (JP) .............................. JP2016-161490

(51) Int. Cl.
| | |
|---|---|
| *B60C 1/00* | (2006.01) |
| *C08C 19/00* | (2006.01) |
| *C08F 4/48* | (2006.01) |
| *C08F 8/30* | (2006.01) |
| *C08F 8/42* | (2006.01) |
| *C08L 15/00* | (2006.01) |
| *C08C 19/25* | (2006.01) |
| *C08K 3/36* | (2006.01) |
| *C08L 23/12* | (2006.01) |
| *C08C 19/22* | (2006.01) |
| *C08C 19/44* | (2006.01) |
| *C08L 19/00* | (2006.01) |
| *C08K 5/548* | (2006.01) |
| *C08K 5/56* | (2006.01) |
| *C08K 3/04* | (2006.01) |
| *C08K 5/09* | (2006.01) |
| *C08K 3/06* | (2006.01) |
| *C08L 91/00* | (2006.01) |
| *C08K 3/22* | (2006.01) |

(52) U.S. Cl.
CPC ............ *C08L 15/00* (2013.01); *B60C 1/00* (2013.01); *B60C 1/0016* (2013.01); *C08C 19/00* (2013.01); *C08C 19/22* (2013.01); *C08C 19/25* (2013.01); *C08C 19/44* (2013.01); *C08F 4/48* (2013.01); *C08F 8/30* (2013.01); *C08F 8/42* (2013.01); *C08K 3/36* (2013.01); *C08K 5/548* (2013.01); *C08K 5/56* (2013.01); *C08L 19/006* (2013.01); *C08L 23/12* (2013.01); *C08K 3/04* (2013.01); *C08K 3/06* (2013.01); *C08K 5/09* (2013.01); *C08K 2003/2296* (2013.01); *C08L 91/00* (2013.01)

(58) Field of Classification Search
CPC ........ C08L 15/00; C08L 19/006; C08L 21/00; C08L 47/00; C08C 19/00; C08C 19/22; C08F 8/30
See application file for complete search history.

(56) References Cited

U.S. PATENT DOCUMENTS

| | | | |
|---|---|---|---|
| 10,766,972 B2 * | 9/2020 | Yamada | .................... C08L 9/06 |
| 2003/0199669 A1 | 10/2003 | Saito et al. | |
| 2006/0173138 A1 | 8/2006 | Hogan et al. | |
| 2013/0018151 A1 | 1/2013 | Maeda et al. | |
| 2013/0023624 A1 | 1/2013 | Sekikawa et al. | |
| 2015/0045474 A1 | 2/2015 | Lee et al. | |
| 2018/0066076 A1 | 3/2018 | Kyo et al. | |

FOREIGN PATENT DOCUMENTS

| | | |
|---|---|---|
| DE | 10-2012-013708 A1 | 1/2013 |
| EP | 0924227 A1 | 6/1999 |
| EP | 2003146 A2 | 12/2008 |
| EP | 2799454 A1 | 11/2014 |
| GB | 2503189 A | 12/2013 |
| JP | 2003-189616 A | 7/1999 |
| JP | H11-189616 A | 7/1999 |

(Continued)

OTHER PUBLICATIONS

International Preliminary Report on Patentability issued in corresponding International Patent Application No. PCT/JP2017/029013 dated Feb. 19, 2019.

(Continued)

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

A modified conjugated diene-based polymer having a nitrogen atom, wherein
a content of the nitrogen atom is 25 mass ppm or more based on a total amount of the modified conjugated diene-based polymer,
a shrinking factor (g') is 0.59 or less in a GPC-light scattering measurement method with a viscosity detector, and
a weight average molecular weight is 200,000 or more and 3,000,000 or less.

18 Claims, No Drawings

(56) References Cited

FOREIGN PATENT DOCUMENTS

| | | |
|---|---|---|
| JP | 2005-290355 A | 10/2005 |
| JP | 2008-527150 A | 7/2008 |
| JP | 2013-082771 A | 5/2013 |
| JP | 2015-528050 A | 9/2015 |
| JP | 2017-002189 A | 1/2017 |
| SG | 174596 A1 | 10/2011 |
| WO | 01/023467 A1 | 4/2001 |
| WO | 2007/114203 A1 | 10/2007 |
| WO | 2010/131668 A1 | 11/2010 |
| WO | 2011/129425 A1 | 10/2011 |
| WO | 2016/133154 A1 | 8/2016 |

OTHER PUBLICATIONS

Supplementary European Search Report issued in corresponding European Patent Application No. 17841440.5 dated Jul. 15, 2019.
International Search Report issued in corresponding International Patent Application No. PCT/JP2017/029013 dated Sep. 19, 2017.

* cited by examiner

MODIFIED CONJUGATED DIENE-BASED POLYMER, PRODUCTION METHOD THEREOF, RUBBER COMPOSITION AND TIRE

TECHNICAL FIELD

The present invention relates to a modified conjugated diene-based polymer and a production method thereof, a rubber composition and a tire.

BACKGROUND ART

Conventionally, there are increasing demands for reduction of fuel consumption in vehicles, and improvement of materials of a vehicle tire, particularly, of a tire tread in contact with the ground is required.

Recently, development of a material having low rolling resistance, namely, a material having a low hysteresis loss property, has been demanded.

Besides, in order to reduce the weight of a tire, it is necessary to reduce the thickness of a tread portion of the tire, and there is a demand for a material having high abrasion resistance.

On the other hand, a material used for a tire tread is required, from the viewpoint of safety, to be excellent in wet skid resistance and to have practically sufficient fracture characteristics.

Examples of the material meeting the requirements as mentioned above include a material comprising a rubber and a reinforcing filler such as carbon black or silica.

If, for example, a material comprising silica is used, balance between the low hysteresis loss property and the wet skid resistance can be improved. Besides, an attempt has been made to reduce a hysteresis loss by improving dispersibility of silica in a material through introduction of a functional group having affinity or reactivity with silica into a molecular end of a rubber having high mobility, and further by reducing the mobility of the molecular end of the rubber through a bond with a silica particle.

For example, Patent Literature 1 proposes a modified diene-based rubber obtained by reacting a modifier having a glycidylamino group with a polymer active end.

Besides, Patent Literatures 2 to 4 propose a modified diene-based rubber obtained by reacting an alkoxysilane having an amino group with a polymer active end, and a composition of such a modified diene-based rubber and silica.

Furthermore, Patent Literatures 5 and 6 propose a polymer functionalized through a reaction of a cyclic aza-sila cycle compound with a polymer active end.

Furthermore, Patent Literature 7 proposes a diene-based rubber obtained through a coupling reaction between a polymer active end and a multi-functional silane compound.

CITATION LIST

Patent Literature

[Patent Literature 1] International Publication No. WO01/23467
[Patent Literature 2] Japanese Patent Laid-Open No. 2005-290355
[Patent Literature 3] Japanese Patent Laid-Open No. 11-189616
[Patent Literature 4] Japanese Patent Laid-Open No. 2003-171418
[Patent Literature 5] National Publication of International Patent Application No. 2008-527150
[Patent Literature 6] International Publication No. WO11/129425
[Patent Literature 7] International Publication No. WO07/114203

SUMMARY OF INVENTION

Technical Problem

Silica has, however, a disadvantage of being inferior in dispersibility to carbon black because it has a hydrophilic surface and hence has lower affinity with a conjugated diene-based rubber than carbon black having a hydrophobic surface. Therefore, a material comprising silica needs to additionally comprise a silane coupling agent or the like to improve the dispersibility by imparting a bond between the silica and the rubber.

Besides, the material in which a functional group having high reactivity with silica is introduced into a molecular end of the rubber disadvantageously tends to be degraded in processability, for example, it becomes difficult to knead because a reaction with a silica particle proceeds during a kneading process to increase the viscosity of a resultant composition, or surface coarseness or sheet breakage is easily caused when formed into a sheet after the kneading. In addition, when such a material is used to obtain a vulcanizate, in particular, used to obtain a vulcanizate comprising an inorganic filler such as silica, the balance between the low hysteresis loss property and the wet skid resistance, and the abrasion resistance are disadvantageously not sufficient.

Furthermore, tire use requires driving stability at the time of continuous run at a high speed, and it is therefore important to exhibit excellent driving stability even when the tire is exposed to a high-temperature environment. Unfortunately, none of known materials have yet obtained sufficient fracture characteristics.

Therefore, an object of the present invention is to provide a modified conjugated diene-based polymer that is excellent in processability when used for obtaining a vulcanizate, excellent in balance between a low hysteresis loss property and wet skid resistance and in abrasion resistance when in the form of a vulcanizate, and has good strain dispersibility at 50° C., excellent repetitive strain strength and practically sufficient fracture characteristics.

Solution to Problem

The present inventors made earnest studies to solve the above-described problems of the related arts, and as a result, it was found that a modified conjugated diene-based polymer having a weight average molecular weight in a prescribed range, having a nitrogen atom at a prescribed content or more and having a shrinking factor (g') smaller than a prescribed value is excellent in processability when used for obtaining a vulcanizate, is excellent in balance between a low hysteresis loss property and wet skid resistance when in the form of a vulcanizate, and has high abrasion resistance, good strain dispersibility at 50° C., excellent repetitive strain strength and practically sufficient fracture characteristics, and thus, the present invention was accomplished.

Specifically, the present invention provides the following:

[1]
A modified conjugated diene-based polymer having a nitrogen atom, wherein a content of the nitrogen atom is 25 mass ppm or more based on a total amount of the modified conjugated diene-based polymer, a shrinking factor (g') is 0.59 or less in a GPC-light scattering measurement method with a viscosity detector, and a weight average molecular weight is 200,000 or more and 3,000,000 or less.

[2]

The modified conjugated diene-based polymer according to [1], wherein a Mooney stress relaxation measured at 110° C. is 0.45 or less.

[3]

The modified conjugated diene-based polymer according to [1] or [2], wherein a modification ratio is 75% by mass or more based on a total amount of a conjugated diene-based polymer.

[4]

The modified conjugated diene-based polymer according to any one of [1] to [3], wherein a plurality of conjugated diene-based polymer chains are bonded to a modifier, and the modified conjugated diene-based polymer has a nitrogen atom in at least one of the conjugated diene-based polymer chains and has a silicon atom in a modifier residue.

[5]

The modified conjugated diene-based polymer according to any one of [1] to [4], wherein a branching degree is 8 or more.

[6]

The modified conjugated diene-based polymer according to any one of [1] to [5], represented by the following general formula (I):

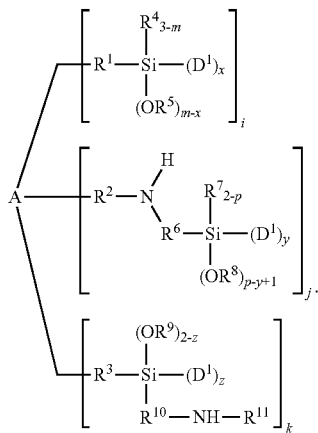

wherein $D^1$ represents a conjugated diene-based polymer chain having a nitrogen atom; $R^1$ to $R^3$ each independently represent a single bond or an alkylene group having 1 to 20 carbon atoms; $R^4$ and $R^7$ each independently represent an alkyl group having 1 to 20 carbon atoms; $R^5$, $R^8$ and $R^9$ each independently represent a hydrogen atom or an alkyl group having 1 to 20 carbon atoms; $R^6$ and $R^{10}$ each independently represent an alkylene group having 1 to 20 carbon atoms; $R^{11}$ represents a hydrogen atom or an alkyl group having 1 to 20 carbon atoms; m and x each independently represent an integer of 1 to 3 as long as being $x \le m$; p represents 1 or 2; y represents an integer of 1 to 3, and $y \le (p+1)$; z represents an integer of 1 or 2; each of $D^1$, $R^1$ to $R^{11}$, m, p, x, y and z, if present in a plural number, is respectively independent and may be the same as or different from each other as long as satisfying $x \le m$ and $y \le (p+1)$; i represents an integer of 0 to 6; j represents an integer of 0 to 6; k represents an integer of 0 to 6; (i+j+k) is an integer of 4 to 10; ((x×i)+(y×j)+(z×k)) is an integer of 8 to 30; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having an active hydrogen.

[7]

The modified conjugated diene-based polymer according to [6], wherein A in the formula (I) is represented by any one of the following general formulae (II) to (V):

wherein $B^1$ represents a single bond or a hydrocarbon group having 1 to 20 carbon atoms; a represents an integer of 1 to 10; and $B^1$, if present in a plural number, is respectively independent;

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

wherein $B^4$ represents a single bond or a hydrocarbon group having 1 to 20 carbon atoms; a represents an integer of 1 to 10; and $B^4$, if present in a plural number, is respectively independent; and

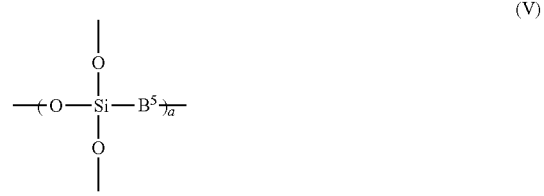

wherein $B^5$ represents a single bond or a hydrocarbon group having 1 to 20 carbon atoms; a represents an integer of 1 to 10; $B^5$, if present in a plural number, is respectively independent.

[8]

A method for producing the modified conjugated diene-based polymer according to any one of [1] to [7], comprising:

a polymerization step of polymerizing at least a conjugated diene compound in the presence of an organolithium compound having at least one nitrogen atom in a molecule, or copolymerizing at least a conjugated diene compound and a copolymerizable monomer having at least one nitrogen atom in a molecule in the presence of an organolithium compound to give a nitrogen-containing conjugated diene-based polymer; and a modification step of modifying the nitrogen-containing conjugated diene-based polymer with a modifier having at least three silicon atoms and at least one nitrogen atom in one molecule and 8 or more reaction active sites.

[9]

The method for producing the modified conjugated diene-based polymer according to [8], wherein the modifier is a modifier having 4 or more alkoxy groups bonded to silicon atoms and having a tertiary amino group.

[10]

The method for producing the modified conjugated diene-based polymer according to [9], wherein the modifier in the reaction step is a compound represented by the following general formula (VI):

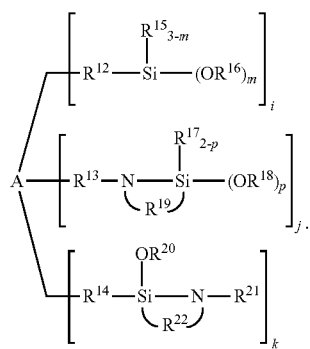

(VI)

wherein $R^{12}$ to $R^{14}$ each independently represent a single bond or an alkylene group having 1 to 20 carbon atoms; $R^{15}$ to $R^{18}$ and $R^{20}$ each independently represent an alkyl group having 1 to 20 carbon atoms; $R^{19}$ and $R^{22}$ each independently represent an alkylene group having 1 to 20 carbon atoms; $R^{21}$ represents an alkyl group having 1 to 20 carbon atoms or a trialkylsilyl group; m represents an integer of 1 to 3; p represents 1 or 2; each of $R^{12}$ to $R^{22}$, m and p, if present in a plural number, is respectively independent, and may be the same as or different from each other; i represents an integer of 0 to 6, j represents an integer of 0 to 6, k represents an integer of 0 to 6, and (i+j+k) is an integer of 4 to 10; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not an having active hydrogen.

[11]

The method for producing the modified conjugated diene-based polymer according to [10], wherein A in the formula (VI) is represented by any one of the following general formulae (II) to (V):

(II)

wherein $B^1$ represents a single bond or a hydrocarbon group having 1 to 20 carbon atoms; a represents an integer of 1 to 10; and $B^1$, if present in a plural number, is respectively independent;

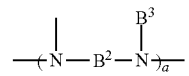

(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

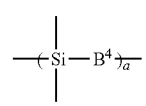

(IV)

wherein $B^4$ represents a single bond or a hydrocarbon group having 1 to 20 carbon atoms; a represents an integer of 1 to 10; and $B^4$, if present in a plural number, is respectively independent; and

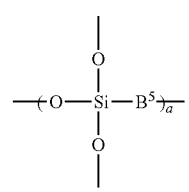

(V)

wherein $B^5$ represents a single bond or a hydrocarbon group having 1 to 20 carbon atoms; a represents an integer of 1 to 10; and $B^5$, if present in a plural number, is respectively independent.

[12]

The method for producing the modified conjugated diene-based polymer according to any one of [8] to [11], wherein the organolithium compound having at least one nitrogen atom in a molecule comprises an organolithium compound represented by any of the following general formulae (1) to (5):

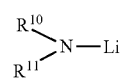

(1)

wherein $R^{10}$ and $R^{11}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{10}$ and $R^{11}$ are optionally bonded to each other to form a cyclic structure together with the adjacent nitrogen atom, wherein $R^{10}$ and $R^{11}$ represents an alkyl group having 5 to 12 carbon atoms and optionally has an unsaturated bond or a branched structure in a part thereof; and the protective group is an alkyl-substituted silyl group,

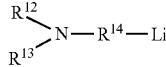

(2)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; and $R^{14}$ represents an alkylene group optionally having an aliphatic or aromatic substituent having 1 to 30 carbon atoms, or a conjugated diene-based polymer having 1 to 20 carbon atoms,

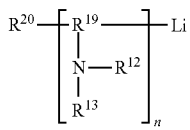

(3)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; $R^{19}$ represents a hydrocarbon group optionally having an aliphatic or aromatic substituent having 1 to 30 carbon atoms; $R^{20}$ represents a hydrocarbon group optionally having a substituted amino group having 1 to 12 carbon atoms; and n represents an integer of 1 to 10,

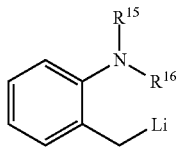

(4)

wherein $R^{15}$ and $R^{16}$ each independently represent at least one group selected from the group consisting of an alkyl group having 1 to 12 carbon atoms, a cycloalkyl group having 3 to 14 carbon atoms, an aryl group having 6 to 20 carbon atoms, and a protective group, or $R^{15}$ and $R^{16}$ are optionally bonded to each other to form a cyclic structure together with the adjacent nitrogen atom, wherein $R^{15}$ and $R^{16}$ represents an alkyl group having 5 to 12 carbon atoms and optionally has a branched structure in a part thereof; and the protective group is an alkyl-substituted silyl group, and

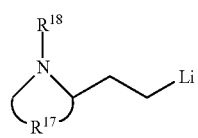

(5)

wherein $R^{17}$ represents a hydrocarbon group having 2 to 10 carbon atoms and optionally has an unsaturated bond or a branched structure in a part thereof; $R^{18}$ represents an alkyl group having 1 to 12 carbon atoms or a protective group and optionally has a branched structure in a part thereof; and the protective group is an alkyl-substituted silyl group.

[13]

An oil-extended modified conjugated diene-based polymer comprising:

100 parts by mass of the modified conjugated diene-based polymer according to any one of [1] to [7]; and 1 to 60 parts by mass of an extender oil.

[14]

A rubber composition, comprising a rubber component and a filler in an amount of 5.0 parts by mass or more and 150 parts by mass based on 100 parts by mass of the rubber component, wherein the rubber component comprises the modified conjugated diene-based polymer according to any one of [1] to [7] in an amount of 10% by mass or more based on a total amount of the rubber component.

[15]

A tire comprising the rubber composition according to [14].

Advantageous Effects of Invention

According to the present invention, a modified conjugated diene-based polymer can be obtained that has excellent processability when used for obtaining a vulcanizate, can achieve excellent balance between a low hysteresis loss property and wet skid resistance when in the form of a vulcanizate, and has excellent abrasion resistance, good strain dispersibility at 50° C., excellent repetitive strain strength and practically sufficient fracture characteristics.

DESCRIPTION OF EMBODIMENTS

Now, an embodiment for practicing the present invention (hereinafter referred to as the "present embodiment") will be described in detail. The following embodiment is illustrative merely, and is not intended to limit the present invention to the following description.

The present invention can be appropriately modified within the scope thereof.

[Modified Conjugated Diene-Based Polymer]

A modified conjugated diene-based polymer of the present embodiment is a modified conjugated diene-based polymer having a nitrogen atom, wherein a content of the nitrogen atom is 25 mass ppm or more based on a total amount of the modified conjugated diene-based polymer, a shrinking factor (g') is 0.59 or less in a GPC-light scattering measurement method with a viscosity detector, and a weight average molecular weight is 200,000 or more and 3,000,000 or less.

The modification ratio of the modified conjugated diene-based polymer of the present embodiment is preferably 75% by mass or more based on the total amount of a conjugated diene-based polymer from the viewpoint of processability, the balance between the low hysteresis loss property and the wet skid resistance, abrasion resistance, and fracture characteristics.

The modification ratio is the mass ratio of a conjugated diene-based polymer having a nitrogen-containing functional group, for example, a conjugated diene-based polymer having a nitrogen-containing functional group at a polymerization starting end or in a main chain and/or a conjugated diene-based polymer modified by a reaction at its terminating end with a nitrogen-containing modifier, to the total amount of a conjugated diene-based polymer The modification ratio is more preferably 78% by mass or more, further preferably 80% by mass or more, further more preferably 85% by mass or more, still further preferably 88% by mass or more, and particularly preferably 90% by mass or more.

The modification ratio can be measured by chromatography that can separate a functional group-containing modified portion from a nonmodified portion.

Examples of the method using this chromatography include a method in which quantitative determination is performed by using a column for gel permeation chromatography using a polar substance such as silica adsorbing a specific functional group as a filler, and using an internal standard of a non-adsorbable component in comparison.

More specifically, the modification ratio can be determined by using a sample solution comprising the sample and low molecular weight internal standard polystyrene and measuring an adsorption amount to a silica column based on a difference between a chromatogram obtained by measurement using a polystyrene-based column and a chromatogram obtained by measurement using a silica-based column. Further specifically, the modification ratio can be measured by a method described in examples.

In the modified conjugated diene-based polymer of the present embodiment, the modification ratio can be controlled by adjusting the addition amount of a modifier and a reaction method and can thereby be controlled to 75% by mass or more. For example, the above-described modification ratio can be attained by carrying out, either appropriately or in combination, a method in which a polymerization is performed with an organolithium compound having at least one nitrogen atom in a molecule described later as a polymerization initiator, a method in which a monomer having at least one nitrogen atom in a molecule is copolymerized, and/or a method using a modifier of a structural formula described later, or by controlling polymerization conditions so as not to excessively accelerate a chain transfer reaction.

The content of the nitrogen atom in the modified conjugated diene-based polymer of the present embodiment is 25 mass ppm or more based on the total amount of the conjugated diene-based polymer.

The content of the nitrogen atom (hereinafter sometimes referred to as the "nitrogen content") is the total amount of nitrogen atoms in the nitrogen-containing functional group of the modified conjugated diene-based polymer, for example, nitrogen-containing functional groups at a starting end, in a main chain, and at a terminating end.

The nitrogen content of the modified conjugated diene-based polymer is 25 mass ppm or more, preferably 40 mass ppm or more, more preferably 50 mass ppm or more, and further preferably 60 mass ppm or more based on the total amount of the modified conjugated diene-based polymer from the viewpoint of processability, the balance between the low hysteresis loss property and the wet skid resistance, abrasion resistance, and fracture characteristics. Besides, the nitrogen content is preferably 500 mass ppm or less, more preferably 400 mass ppm or less, further preferably 300 mass ppm or less, and further more preferably 250 mass ppm or less from the viewpoint of processability.

The content of the nitrogen atom can be measured by oxidative combustion with chemiluminescence detection (JIS-2609: Standard Test Method for the Determination of Nitrogen in Crude Petroleum and Petroleum Products).

More specifically, the content of the nitrogen atom can be measured by a method described in examples below.

There is a tendency that the nitrogen content can be controlled by adjusting the addition amount of a modifier and a reaction method, and 25 mass ppm or more can be attained by this method. Examples thereof include a method in which a conjugated diene-based polymer having a nitrogen atom is reacted with a modifier having at least one nitrogen atom in a molecule, the conjugated diene-based polymer being obtained by a method in which a polymerization is performed with an organolithium compound having at least one nitrogen atom in a molecule described later as a polymerization initiator, or a method in which a monomer having at least one nitrogen atom in a molecule is copolymerized.

Examples of the method for obtaining the modified conjugated diene-based polymer having a nitrogen content of 500 mass ppm or less include a method in which the molecular weight of a conjugated diene-based polymer chain is controlled so as not to be too small.

The shrinking factor (g') of the modified conjugated diene-based polymer of the present embodiment determined by a GPC-light scattering measurement method with a viscosity detector is 0.59 or less from the viewpoint of processability, the balance between the low hysteresis loss property and the wet skid resistance, abrasion resistance, and fracture characteristics. The shrinking factor (g') of 0.59 or less means that the modified conjugated diene-based polymer of the present embodiment substantially has 8 or more branches.

In general, there is a tendency that a branched polymer has a smaller molecule than a straight chain polymer having the same absolute molecular weight. The shrinking factor (g') of the modified conjugated diene-based polymer of the present embodiment is an index of a ratio in a size occupied by a molecule to a straight chain polymer assumed to have the same absolute molecular weight. In other words, there is a tendency that as a branching degree of a polymer is larger, the shrinking factor (g') is smaller.

In the present embodiment, an intrinsic viscosity is used as an index of a size of a molecule, and is based on the assumption that a straight chain polymer has an intrinsic viscosity complying with a relational expression, intrinsic viscosity $[\eta] = -3.883 \, M^{0.771}$ (wherein M is the absolute molecular weight).

A shrinking factor (g') corresponding to each absolute molecular weight of a modified conjugated diene-based polymer is calculated, and an average of the shrinking factors (g') corresponding to the absolute molecular weights of $100\times10^4$ to $200\times10^4$ is defined as the shrinking factor (g') of the modified conjugated diene-based polymer. Herein, the "branch" is formed through a direct or indirect bond of one polymer to another polymer. Besides, the term "branching degree" refers to the number of polymers directly or indirectly bonding to one branch. For example, if five conjugated diene-based polymer chains described later are mutually bonded indirectly via a modifier residue described later, the branching degree is 5.

The shrinking factor (g') is 0.59 or less, preferably 0.57 or less, more preferably 0.55 or less, and further preferably 0.53 or less.

Besides, the shrinking factor (g') is not especially limited in the lower limit and may be below a detection limit, and is preferably 0.30 or more, more preferably 0.33 or more, further preferably 0.35 or more, and further more preferably 0.45 or more.

A modified conjugated diene-based polymer having a shrinking factor (g') falling in this range tends to be excellent in processability when used for obtaining a vulcanizate.

Since the shrinking factor (g') tends to depend on the branching degree, the shrinking factor (g') can be controlled by using, for example, the branching degree as an index.

Specifically, if a modified conjugated diene-based polymer has a branching degree of 8, the shrinking factor (g') thereof tends to be 0.45 or more and 0.59 or less.

The shrinking factor (g') can be measured by a method described in examples below.

The weight average molecular weight of the modified conjugated diene-based polymer of the present embodiment is $20\times10^4$ or more and $300\times10^4$ or less from the viewpoint of processability, the balance between the low hysteresis loss property and the wet skid resistance, abrasion resistance, and fracture characteristics.

If the weight average molecular weight is $20\times10^4$ or more, the balance between the low hysteresis loss property and the wet skid resistance and the abrasion resistance when in the form of a vulcanizate are excellent.

Besides, if the weight average molecular weight is $300\times10^4$ or less, the processability and dispersibility of a filler when used for obtaining a vulcanizate can be excellent, and practically sufficient fracture characteristics can be attained.

The weight average molecular weight of the modified conjugated diene-based polymer is preferably $50\times10^4$ or more, more preferably $64\times10^4$ or more, and further preferably $80\times10^4$ or more. Besides, the weight average molecular weight is preferably $250\times10^4$ or less, more preferably $180\times10^4$ or less, and further preferably $150\times10^4$ or less.

The weight average molecular weights of the modified conjugated diene-based polymer of the present embodiment and a conjugated diene-based polymer described later can be measured on the basis of a calibration curve obtained using standard polystyrene and by measuring a chromatogram using a GPC measurement apparatus and using an RI detector. Specifically, the weight average molecular weights can be measured by a method described in examples below.

The weight average molecular weight of the modified conjugated diene-based polymer can be controlled by adjusting the molecular weight of a conjugated diene-based polymer chain that is adjustable by the ratio between the amount of a polymerization initiator to be used and the amount of a monomer to be used, and the type of a modifier and the amount of the modifier to be used.

A monomer constituting the polymer chain of the modified conjugated diene-based polymer of the present embodiment comprises a conjugated diene compound, or a conjugated diene compound and copolymerizable another monomer.

The conjugated diene compound is preferably a conjugated diene having 4 to 12 carbon atoms, and examples thereof include, but are not limited to, 1,3-butadiene, isoprene, 2,3-dimethyl-1,3-butadiene, 1,3-pentadiene, 3-methyl-1,3-pentadiene, 1,3-hexadiene, and 1,3-heptadiene. Among these, 1,3-butadiene and isoprene are preferred from the viewpoint of industrial availability.

One of these compounds may be singly used, or two or more of these may be used together.

The copolymerizable another monomer is preferably, for example, a vinyl aromatic compound, and more preferably styrene.

It is preferable that the modified conjugated diene-based polymer of the present embodiment comprises a silicon atom.

Examples of the method for measuring the silicon atom in the modified conjugated diene-based polymer include a method in which measurement is performed by using a ultraviolet visible spectrophotometer in accordance with JIS K 0101 44.3.1, and quantitative determination is performed by a molybdenum blue-spectrophotometric method.

When the silicon atom is contained, there is a tendency that the interaction with a filler, for example, silica, which is added for obtaining a composition, is strengthened. The silicon atom content of the modified conjugated diene-based polymer of the present embodiment is preferably 10 ppm or more, more preferably 12 ppm or more, and further preferably 15 ppm or more.

The Mooney stress relaxation measured at preferably 110° C. (hereinafter sometimes simply referred to as the "Mooney stress relaxation" or "MSR") of the modified conjugated diene-based polymer of the present embodiment is preferably 0.45 or less.

The Mooney stress relaxation is an index for a molecular entanglement of the modified conjugated diene-based copolymer, and a lower value thereof means more molecular entanglements. The Mooney stress relaxation is an index for a branched structure and a molecular weight.

The Mooney stress relaxation at 110° C. of the modified conjugated diene-based polymer of the present embodiment is preferably 0.45 or less, more preferably 0.42 or less, further preferably 0.40 or less, further more preferably 0.38 or less, and still further preferably 0.35 or less. Besides, the Mooney stress relaxation is not especially limited in the lower limit and may be below a detection limit, and is preferably 0.05 or more.

When the Mooney stress relaxation is 0.45 or less, the modified conjugated diene-based polymer exhibits better processability.

The MSR of the modified conjugated diene-based polymer is an index for the molecular weight and the number of branches of the modified conjugated diene-based polymer.

For example, as the MSR decreases, the molecular weight and the number of branches (for example, the number of branches of a star polymer (sometimes referred to as the "number of arms of a star polymer")) of the modified conjugated diene-based polymer tend to increase.

In the case of comparing modified conjugated diene-based polymers having an equal Mooney viscosity described later, a modified conjugated diene-based polymer having more branches has smaller MSR, and therefore, in this case, the MSR can be used as an index for a branching degree.

The MSR can be measured using a Mooney viscometer as follows.

The measurement temperature of the Mooney stress relaxation is set to 110° C. First, a sample is preheated for 1 minute, the rotor is rotated at 2 rpm, a torque is measured 4 minutes after, and the measured value is defined as a Mooney viscosity ($ML_{(1+4)}$).

Then, the rotation of the rotor is immediately terminated, the torque is recorded at a Mooney unit per 0.1 seconds from 1.6 seconds to 5 seconds after the termination, the slope of a straight line in double logarithmic plot of the torque and the time (sec) is determined, and the absolute value thereof is defined as a Mooney stress relaxation (MSR).

More specifically, the MSR can be measured by a method described in examples below.

In order to set the Mooney stress relaxation to 0.45 or less, the molecular structure is controlled such that the molecular weight distribution is widened to elevate the weight average molecular weight and to increase the amount of high molecular weight components, and the branching degree is elevated.

For example, the modified conjugated diene-based polymer having a weight average molecular weight of $10 \times 10^4$ or more and a branching degree of 8 or more tends to have a Mooney stress relaxation of 0.45 or less. Besides, in order to set the Mooney stress relaxation to 0.40 or less, for example, the modified conjugated diene-based polymer having a weight average molecular weight of $30 \times 10^4$ or more and a branching degree of 8 or more tends to have a Mooney stress relaxation of 0.40 or less. The branching degree can be controlled by, for example, the number of functional groups in a modifier, the addition amount of the modifier, or the degree of progression of metalation.

Preferably, the modified conjugated diene-based polymer of the present embodiment has a structure in which a plurality of conjugated diene-based polymer chains are bonded to a modifier, and this modified conjugated diene-based polymer has a nitrogen atom in at least one of the conjugated diene-based polymer chains and has a silicon atom in a modifier residue.

Herein, the phrase "conjugated diene-based polymer chains are bonded to a modifier" represents the state of a compound formed by the bonding of polymer chains to a so-called coupling agent (modifier) in the production process of a polymer, and the structure of the "modifier" (sometimes referred to as the "modifier residue") in a polymer differs from the structure of the initial modifier in that the leaving group of the modifier before reaction is no longer present, and the polymer chains are bonded. In other words, the modifier (residue) contained in the modified conjugated diene-based polymer is a constituent unit of the modified conjugated diene-based polymer bonded to the conjugated diene-based polymer chains, and is, for example, a constituent unit derived from a modifier and generated through a reaction between the conjugated diene-based polymer and the modifier described later.

When the modified conjugated diene-based polymer comprises a nitrogen atom and a silicon atom in a modifier, there is a tendency that the interaction of the modified conjugated diene-based polymer comprising both a nitrogen atom and a silicon atom with a filler, for example, silica, which is added for obtaining a composition, is stronger than that of a modified conjugated diene-based polymer comprising only one of them.

<Conjugated Diene-Based Polymer Chain and Star Branched Structure>

The conjugated diene-based polymer chain is a constituent unit of the modified conjugated diene-based polymer, and is a constituent unit derived from a conjugated diene-based polymer and generated, for example, through a reaction between the conjugated diene-based polymer and a modifier described later.

It is preferable that the modified conjugated diene-based polymer of the present embodiment has a star branched structure in which a plurality of conjugated diene-based polymer chains are bonded to one modifier described later.

The modified conjugated diene-based polymer having a star branched structure in which a plurality of conjugated diene-based polymer chains are bonded to one modifier tends to be excellent in processability when used for obtaining a vulcanizate.

<Nitrogen-Containing Conjugated Diene-Based Polymer Chain>

For the conjugated diene-based polymer chains, it is preferable that at least one of the conjugated diene-based polymer chains has a nitrogen atom.

For example, such a conjugated diene-based polymer chain has a functional group comprising a nitrogen atom at any position, and the position of the functional group may be an end or may be the middle of a main chain. The conjugated diene-based polymer chain having a nitrogen atom is obtained by, for example, a method in which a polymerization is performed with an organolithium compound having at least one nitrogen atom in a molecule described later as a polymerization initiator, or a method in which a monomer having at least one nitrogen atom in a molecule is copolymerized.

<Modifier Residue Having Silicon Atom>

It is preferable that the modified conjugated diene-based polymer of the present embodiment has a silicon atom in a modifier residue.

For example, such a modified conjugated diene-based polymer has a constituent unit derived from a modifier by having a silicon atom in a modifier described later.

The modified conjugated diene-based polymer of the present embodiment is preferably a modified conjugated diene-based polymer having a branching degree of 8 or more.

The branching degree is not especially limited in the upper limit and is preferably 18 or less. The modified conjugated diene-based polymer having a branching degree of 8 or more is excellent in processability when used for obtaining a vulcanizate.

Besides, more preferably, the modified conjugated diene-based polymer has one or more modifier residues and conjugated diene-based polymer chains bonded to the modifier residues, and the branches include a branch in which 8 or more of the conjugated diene-based polymer chains are bonded to one of the modifier residues. If the structure of the modified conjugated diene-based polymer is specified so that the branching degree can be 8 or more, the shrinking factor (g') can be more definitely set to be 0.59 or less.

The "branching degree of 8 or more" includes the state where the main chain has side chains so that the branching degree is 8 or more, and the state where 8 or more conjugated diene-based polymer chains are bonded to one modifier residue (star form; state where the polymer chains are radially bonded to the modifier residue).

Besides, it is preferable that the modified conjugated diene-based polymer of the present embodiment has a silicon atom at any position.

The silicon atom is preferably contained in a functional group which is bonded to an end of a conjugated diene-based polymer chain or in the middle of a main chain thereof, or contained in a modifier residue. It is more preferable that at least one silicon atom of this modified conjugated diene-based polymer constitutes an alkoxysilyl group having 1 to 20 carbon atoms or a silanol group. Thus, there is a tendency that the interaction with a filler, for example, silica, which is added for obtaining a vulcanizate, is strengthened. Besides, from the viewpoint that hydrogen halide can be generated through a reaction with the air, the modified conjugated diene-based polymer preferably does not have halogen.

It is preferable that at least one end of the eight or more conjugated diene-based polymer chains is bonded to a silicon atom of the modifier residue. Thus, the effects of the present embodiment tend to be more conspicuous. In this case, ends of a plurality of the conjugated diene-based polymer chains may be bonded to one silicon atom. Alternatively, an end of the conjugated diene-based polymer chain and an alkoxy group having 1 to 20 carbon atoms or a hydroxyl group may be bonded to one silicon atom, so that the one silicon atom can constitute an alkoxysilyl group having 1 to 20 carbon atoms or a silanol group. From the viewpoint that hydrogen halide can be generated through a reaction with the air or moisture, the modifier residue preferably does not have halogen.

When the modified conjugated diene-based polymer of the present embodiment or a conjugated diene-based polymer described later is further hydrogenated in an inert solvent, all or some of double bonds may be converted into saturated hydrocarbon. In this case, heat resistance and weather resistance can be improved so as to prevent degradation of a product when processed at a high temperature, and the dynamic performance as a rubber tends to be improved. As a result, further excellent performance can be exhibited in various uses including vehicle use. More specifically, a hydrogenation rate of an unsaturated double bond based on a conjugated diene compound can be arbitrarily selected in accordance with the purpose, and is not especially limited. When it is used in the form of a vulcanizate, a double bond of a conjugated diene portion preferably partially remains. From this viewpoint, a rate of hydrogenation of the conjugated diene portion in the conjugated diene-based polymer is preferably 3.0% or more and 70% or less, more preferably 5.0 or more and 65% or less, and further preferably 10% or more and 60% or less. In particular, if a vinyl group is selectively hydrogenated, the heat resistance and the dynamic performance tend to be improved. The hydrogenation rate can be obtained using a nuclear magnetic resonance apparatus (NMR).

A modified conjugated diene-based copolymer of the present embodiment can be made into an oil-extended modified conjugated diene-based polymer additionally comprising an extender oil.

The oil-extended modified conjugated diene-based polymer of the present embodiment comprises preferably 1 to 60 parts by mass, more preferably 5 to 50 parts by mass, and further preferably 10 to 37.5 parts by mass of an extender oil per 100 parts by mass of the modified conjugated diene-based polymer mentioned above.

The above-described content produces the effect of improving productivity in such a way that the viscosity of a polymer solution can decrease to prevent rapid increase in the internal pressure of the system.

No matter whether the modified conjugated diene-based copolymer of the present embodiment is non-oil-extended or oil-extended, a Mooney viscosity measured at 100° C. is preferably 20 or more and 100 or less, and more preferably 30 or more and 90 or less from the viewpoint of the processability when used for obtaining a rubber vulcanizate and the abrasion resistance when in the form of a vulcanizate.

The Mooney viscosity can be measured by a method described in the examples below.

The modified conjugated diene-based polymer of the present embodiment preferably has a molecular weight distribution (Mw/Mn) corresponding to a ratio of a weight average molecular weight (Mw) to a number average molecular weight (Mn) is 1.1 or more and 3.0 or less. A modified conjugated diene-based polymer having a molecular weight distribution falling in this range tends to be more excellent in the processability when used for obtaining a vulcanizate and more excellent in the abrasion resistance when in the form of a vulcanizate. The molecular weight distribution (Mw/Mn) is more preferably 1.5 or more and 2.5 or less.

The number average molecular weights, the weight average molecular weights and the molecular weight distributions of the modified conjugated diene-based polymer and the conjugated diene-based polymer described later can be measured by methods described in the examples below.

The modified conjugated diene-based polymer of the present embodiment is preferably represented by the following general formula (I):

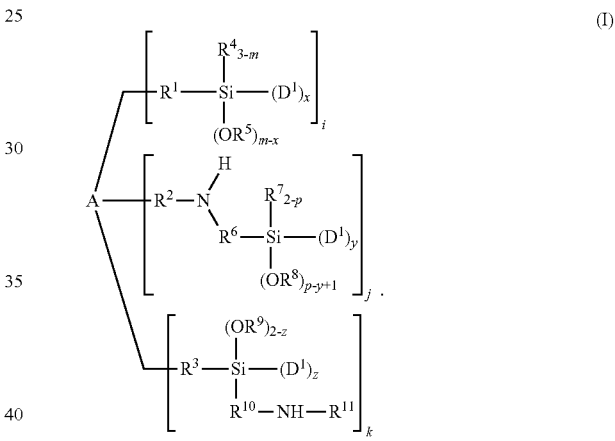

In formula (I), $D^1$ represents a conjugated diene-based polymer chain having a nitrogen atom, and a weight average molecular weight of the diene-based polymer chain is preferably $10 \times 10^4$ to $100 \times 10^4$. $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, and $R^1$ represents a hydrogen atom or an alkyl group having 1 to 20 carbon atoms. Besides, m and x each represent an integer of 1 to 3, x≤m, p represents 1 or 2, y represents an integer of 1 to 3, y≤(p+1), and z represents an integer of 1 or 2. Each of $D^1$, $R^1$ to $R^{11}$, m, p, x, y and z, if present in a plural number, is respectively independent and may be the same as or different from each other. Furthermore, i represents an integer of 0 to 6, j represents an integer of 0 to 6, k represents an integer of 0 to 6, (i+j+k) is an integer of 4 to 10, and ((x×i)+(y×j)+(z×k)) is an integer of 8 to 30. Besides, A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having an active hydrogen. A hydrocarbon group represented by A includes saturated, unsaturated, aliphatic and aromatic hydrocarbon groups. The organic group not having an active hydrogen is an organic group not inactivating an active end of the conjugated diene-based polymer. An example of the organic group not having active hydrogen includes an organic group not having a functional group having active hydrogen such as a hydroxyl group (—OH), a secondary amino group (>NH), a primary amino group (—NH$_2$) or a sulfhydryl group (—SH). The organic group not having active hydrogen includes an inactivated form of the functional group having active hydrogen by substitution with a protective group. The protective group is preferably an alkyl-substituted silyl group.

The modified conjugated diene-based polymer represented by formula (I) tends to be more excellent in the processability when used for obtaining a vulcanizate, and more particularly excellent in the balance between the low hysteresis loss property and the wet skid resistance and the abrasion resistance when in the form of a vulcanizate as the effects of the present embodiment.

In the modified conjugated diene-based polymer of the present embodiment, A in formula (I) is preferably represented by any one of the following general formulae (II) to (V):

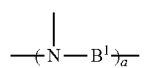
(II)

In formula (II), $B^1$ represents a single bond or a hydrocarbon group having 1 to 20 carbon atoms, and a represents an integer of 1 to 10. $B^1$, if present in a plural number, is respectively independent.

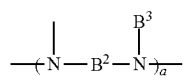
(III)

In formula (III), $B^2$ represents a single bond or a hydrocarbon group having 1 to 20 carbon atoms, $B^3$ represents an alkyl group having 1 to 20 carbon atoms, and a represents an integer of 1 to 10. Each of $B^2$ and $B^3$, if present in a plural number, is respectively independent.

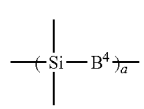
(IV)

In formula (IV), $B^4$ represents a single bond or a hydrocarbon group having 1 to 20 carbon atoms, and a represents an integer of 1 to 10. $B^4$, if present in a plural number, is respectively independent.

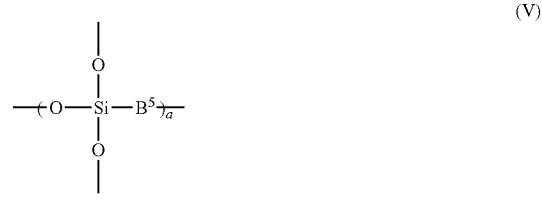

In formula (V), $B^5$ represents a single bond or a hydrocarbon group having 1 to 20 carbon atoms, and a represents an integer of 1 to 10.

$B^5$, if present in a plural number, is respectively independent. If A is represented by any one of formulae (II) to (V), the processability when used for obtaining a vulcanizate tends to be more excellent, and the balance between the low hysteresis loss property and the wet skid resistance and the abrasion resistance when in the form of a vulcanizate tend to be more excellent as the effects of the present embodiment. Besides, such a polymer tends to be practically more easily available.

[Method for Producing Modified Conjugated Diene-Based Polymer]

A method for producing the modified conjugated diene-based copolymer of the present embodiment has a polymerization step of polymerizing at least a conjugated diene compound in the presence of an organolithium compound having at least one nitrogen atom in a molecule, or copolymerizing at least a conjugated diene compound and a copolymerizable monomer having at least one nitrogen atom in a molecule in the presence of an organolithium compound to give a nitrogen-containing conjugated diene-based polymer, and a modification step of modifying the nitrogen-containing conjugated diene-based polymer with a modifier having at least three silicon atoms and at least one nitrogen atom in one molecule and 8 or more reaction active sites.

(Polymerization Step)

The polymerization step in the method for producing the modified conjugated diene-based polymer of the present embodiment is a polymerization step of polymerizing at least a conjugated diene compound in the presence of an organolithium compound having at least one nitrogen atom in a molecule, or copolymerizing at least a conjugated diene compound and a copolymerizable monomer having at least one nitrogen atom in a molecule in the presence of an organolithium compound to give a nitrogen-containing conjugated diene-based polymer.

The polymerization step is preferably performed by polymerization through a growth reaction by living anionic polymerization, and thus, a conjugated diene-based polymer having an active end can be obtained, and there is a tendency that a modified diene-based polymer having a high modification ratio can be obtained.

<Conjugated Diene-Based Polymer>

The conjugated diene-based polymer to be produced in the polymerization step is obtained by polymerizing at least a conjugated diene compound as a monomer, and is obtained, if necessary, by copolymerizing both a conjugated diene compound and copolymerizable another monomer.

The conjugated diene compound is not especially limited as long as it is a polymerizable conjugated diene compound, and is preferably a conjugated diene compound comprising 4 to 12 carbon atoms per molecule, and more preferably a conjugated diene compound comprising 4 to 8 carbon atoms. Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene.

Among these, 1,3-butadiene and isoprene are preferred from the viewpoint of industrial availability. One of these compounds may be singly used, or two or more of these may be used together.

The copolymerizable another monomer is not especially limited as long as it is a monomer copolymerizable with a conjugated diene compound, and is preferably a vinyl-substituted aromatic compound.

Examples of the monovinyl aromatic compound include, but are not limited to, styrene, p-methylstyrene, α-methylstyrene, vinyl ethyl benzene, vinyl xylene, vinyl naphthalene and diphenyl ethylene. Among these, styrene is preferred from the viewpoint of industrial availability.

One of these compounds may be singly used, or two or more of these may be used together.

If the conjugated diene compound and/or the vinyl-substituted aromatic compound comprise any of allenes, acetylenes and the like as an impurity, it is apprehended that the polymerization reaction in the reaction step described later may be impaired. Therefore, the sum of content concentrations (masses) of these impurities is preferably 200 ppm or less, more preferably 100 ppm or less, and further preferably 50 ppm or less.

Examples of the allenes include propadiene and 1,2-butadiene. Examples of the acetylenes include ethyl acetylene and vinyl acetylene.

The conjugated diene-based polymer may be a random copolymer or a block copolymer. In order to form the conjugated diene-based polymer as a rubber-like polymer, the conjugated diene compound is used in an amount of preferably 40% by mass or more and more preferably 55% by mass or more based on the amount of all monomers used in the conjugated diene-based polymer.

Examples of the random copolymer include, but are not limited to, a random copolymer comprising two or more conjugated diene compounds such as a butadiene-isoprene random copolymer, and a random copolymer comprising various conjugated diene and the vinyl-substituted aromatic compound such as a butadiene-styrene random copolymer, an isoprene-styrene random copolymer or a butadiene-isoprene-styrene random copolymer. A composition distribution of each monomer contained in a copolymer chain is not especially limited, and examples include a completely random copolymer whose composition is almost statistically random, and a tapered (gradient) random copolymer whose composition is distributed in a tapered manner. A bonding mode of the conjugated diene, namely, the composition of a 1,4-bond, a 1,2-bond or the like may be homogeneous or distributed.

Examples of the block copolymer include, but are not limited to, a two-block (diblock) copolymer consisting of two blocks, a three-block (tri-block) copolymer consisting of three blocks, and a four-block (tetra-block) copolymer consisting of four blocks. A polymer constituting every block may be a polymer comprising one monomer or a copolymer comprising two or more monomers. Assuming that a polymer block comprising 1,3-butadiene is expressed as "B", a copolymer of 1,3-butadiene and isoprene is expressed as "B/I", a copolymer of 1,3-butadiene and styrene is expressed as "B/S" and a polymer block comprising styrene is expressed as "S", the block copolymer is expressed as a B-B/I two-block copolymer, a B-B/S two-block copolymer, a S-B two-block copolymer, a B-B/S-S three-block copolymer, a S-B-S three-block copolymer, a S-B-S-B four-block copolymer or the like.

In the above-described formula, there is no need to always clearly define a boundary between blocks. Besides, if one polymer block is a copolymer comprising two monomers A and B, the monomers A and B may be distributed homogeneously or in a tapered manner in the block.

<Polymerization Initiator>

In the polymerization step, a prescribed polymerization initiator is used.

Examples of the polymerization initiator include organolithium compounds as described above, and an organolithium compound having at least one nitrogen atom in a molecule is preferably used.

Examples of the organolithium compound include organomonolithium compounds, and another polymerization initiator may be used together therewith.

Examples of the organomonolithium compound include, but are not limited to, a low molecular weight compound and an organomonolithium compound of a solubilized oligomer. Another example of the organomonolithium compound includes a compound having, as a bonding mode between an organic group and lithium therein, a carbon-lithium bond, a nitrogen-lithium bond or a tin-lithium bond.

The amount of the organomonolithium compound to be used as a polymerization initiator is preferably determined on the basis of the molecular weight of the target conjugated diene-based polymer or modified conjugated diene-based polymer.

There is a tendency that a ratio of the amount of a monomer such as the conjugated diene compound to be used to the amount of the polymerization initiator to be used relates to the degree of polymerization, namely, the number average molecular weight and/or the weight average molecular weight. Accordingly, in order to increase the molecular weight, adjustment may be made to reduce the amount of the polymerization initiator, and in order to reduce the molecular weight, the adjustment may be made to increase the amount of the polymerization initiator.

The organomonolithium compound is preferably an alkyl lithium compound having a substituted amino group, or a substituted amino lithium compound from the viewpoint of use in one approach of introducing a nitrogen atom to a conjugated diene-based polymer. In this case, a conjugated diene-based polymer having a nitrogen atom derived from an amino group at a polymerization starting end can be obtained. The substituted amino group refers to an amino group having no active hydrogen or having a structure in which active hydrogen is protected.

The organolithium compound having at least one nitrogen atom in a molecule as the polymerization initiator includes an organolithium compound represented by any of the following general formulae (1) to (5):

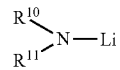

(1)

wherein $R^{10}$ and $R^{11}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{10}$ and $R^{11}$ are optionally bonded to each other to form a cyclic structure together with the adjacent nitrogen atom, wherein $R^{10}$ and $R^{11}$ represents an alkyl group having 5 to 12 carbon atoms and optionally has an unsaturated bond or a branched structure in a part thereof; and the protective group is an alkyl-substituted silyl group,

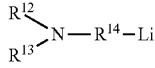

(2)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; and $R^{14}$ represents an alkylene group optionally having an aliphatic or aromatic substituent having 1 to 30 carbon atoms, or a conjugated diene-based polymer having 1 to 20 carbon atoms,

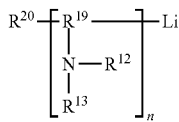

(3)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; $R^{19}$ represents a hydrocarbon group optionally having an aliphatic or aromatic substituent having 1 to 30 carbon atoms; $R^{20}$ represents a hydrocarbon group optionally having a substituted amino group having 1 to 12 carbon atoms; and n represents an integer of 1 to 10,

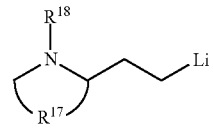

(4)

wherein $R^{15}$ and $R^{16}$ each independently represent at least one group selected from the group consisting of an alkyl group having 1 to 12 carbon atoms, a cycloalkyl group having 3 to 14 carbon atoms, an aryl group having 6 to 20 carbon atoms, and a protective group, or $R^{15}$ and $R^{16}$ are optionally bonded to each other to form a cyclic structure together with the adjacent nitrogen atom, wherein each of $R^{15}$ and $R^{16}$ represents an alkyl group having 5 to 12 carbon atoms and optionally has a branched structure in a part thereof; and the protective group is an alkyl-substituted silyl group, and

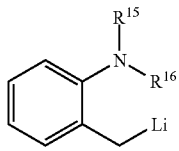

(5)

wherein $R^{17}$ represents a hydrocarbon group having 2 to 10 carbon atoms and optionally has an unsaturated bond or a branched structure in a part thereof; $R^{18}$ represents an alkyl group having 1 to 12 carbon atoms or a protective group and optionally has a branched structure in a part thereof; and the protective group is an alkyl-substituted silyl group.

In the formula (1), examples of the group represented by $R^{10}$ or $R^{11}$ include a methyl group, an ethyl group, a propyl group, a butyl group, an octyl group, a benzyl group, a cyclopropyl group, a cyclohexyl group, a 3-phenyl-1-propyl group, an isobutyl group, a decyl group, a heptyl group, and a phenyl group.

$R^{10}$ and $R^{11}$ are not limited to these and include analogs thereof as long as they satisfy the above-described conditions.

A butyl group and a hexyl group are preferred, and a butyl group is more preferred from the viewpoint of solubility in a solvent and reduction in hysteresis loss of a modified conjugated diene-based polymer composition described later, and from the viewpoint of chain transfer reaction control described later.

Examples of the organolithium compound having at least one nitrogen atom in a molecule represented by formula (1) include, but are not limited to, ethylpropylamino lithium, ethylbutylamino lithium, ethylbenzylamino lithium, dibutylamino lithium, and dihexylamino lithium. Among these, dibutylamino lithium and dihexylamino lithium are preferred, and dibutylamino lithium is more preferred.

In the formula (1), when $R^{10}$ and $R^{11}$ are bonded to each other to form a cyclic structure together with the adjacent nitrogen atom, examples of the organolithium compound represented by the formula (1) include, but are not limited to, piperidino lithium, hexamethyleneimino lithium, lithium azacyclooctane, lithium-1,3,3-trimethyl-6-azabicyclo[3.2.1]octane, 1,2,3,6-tetrahydropyridino lithium, and 3,5-dimethylpiperidino lithium.

The organolithium compound having at least one nitrogen atom in a molecule is not limited to these and includes analogs thereof as long as they satisfy the above-described conditions. Piperidino lithium, hexamethyleneimino lithium, lithium azacyclooctane, and lithium-1,3,3-trimethyl-6-azabicyclo[3.2.1]octane are preferred, piperidino lithium, hexamethyleneimino lithium, and 3,5-dimethylpiperidino lithium are more preferred, and piperidino lithium is further preferred from the viewpoint of solubility of the polymerization initiator in a solvent and reduction in unpleasant smell of the modified conjugated diene-based polymer described later, and from the viewpoint of suppression of a chain transfer reaction.

In the formula (2), $R^{14}$ represents an alkylene group optionally having an aliphatic or aromatic substituent having 1 to 30 carbon atoms, or a conjugated diene-based polymer having 1 to 20 carbon atoms. The conjugated diene-based polymer preferably represents a polymer comprising a conjugated diene compound having 4 to 12 carbon atoms as a repeating unit. Examples of the conjugated diene compound include 1,3-butadiene, isoprene, 2,3-dimethyl-1,3-butadiene, 1,3-pentadiene, 3-methyl-1,3-pentadiene, 1,3-hexadiene, and 1,3-heptadiene. Among these, 1,3-butadiene and isoprene are preferred from the viewpoint of industrial availability. One of these compounds may be singly used, or two or more of these may be used together.

In the formula (2), when $R^{14}$ represents an alkylene group having 1 to 30 carbon atoms, $R^{14}$ preferably represents an alkylene group having 2 to 20 carbon atoms and more preferably represents an alkylene group having 3 to 16 carbon atoms from the viewpoint of reactivity and an interactive property with an inorganic filler such as carbon or silica. Besides, when $R^{14}$ represents an alkylene group having 1 to 30 carbon atoms, examples of the organolithium compound represented by formula (2) include, but are not limited to, (3-(dimethylamino)-propyl) lithium, (3-(diethylamino)-propyl) lithium, (3-(dipropylamino)-propyl) lithium, (3-(dibutylamino)-propyl) lithium, (3-(dipentylamino)-propyl) lithium, (3-(dihexylamino)-propyl) lithium, (3-(dioctylamino)-propyl) lithium, (3-(ethylhexylamino)-propyl) lithium, (3-(didecylamino)-propyl) lithium, (3-(ethylpropylamino-propyl) lithium, (3-(ethylbutylamino-propyl) lithium, (3-(ethylbenzylamino)-propyl) lithium, (3-(methylphenethylamino)-propyl) lithium, (4-(dibutylamino)-butyl) lithium, (5-(dibutylamino)-pentyl) lithium, (6-(dibutylamino)-hexyl) lithium, (10-(dibutylamino)-decyl) lithium, (5-(dibutylamino)-1-phenylpentyl) lithium, (5-(dibutylamino)-1,1-diphenylpentyl) lithium, 3-N,N-bistrimethylsilylaminopropyl lithium, 4-N-trimethylsilyl-N-methylaminobutyl lithium, and 6-N-trimethylsilyl-N-butylaminohexyl lithium.

The organolithium compound having at least one nitrogen atom in a molecule is not limited to these and includes analogs thereof as long as they satisfy the above-described conditions. (3-(Dibutylamino)-propyl) lithium is more preferred from the viewpoint of reactivity and an interactive property with an inorganic filler such as carbon or silica.

In the formula (2), when $R^{14}$ represents a conjugated diene-based polymer, examples of the organolithium compound represented by formula (2) include, but are not limited to, (4-(dimethylamino)-2-butenyl) lithium, (4-(diethylamino)-2-butenyl) lithium, (4-(dibutylamino)-2-butenyl) lithium, (4-(dipropylamino)-2-butenyl) lithium, (4-(diheptylamino)-2-butenyl) lithium, (4-(dihexylamino)-2-butenyl) lithium, (4-(dioctylamino)-2-butenyl) lithium, (4-(di-2-ethylhexylamino)-2-butenyl) lithium, (4-(didecylamino)-2-butenyl) lithium, (4-(ethylpropylamino)-2-butenyl) lithium, (4-(ethylbutylamino)-2-butenyl) lithium, (4-(ethylbenzylamino)-2-butenyl) lithium, (4-(methylphenethylamino)-2-butenyl) lithium, (4-(dimethylamino)-2-methyl-2-butenyl) lithium, (4-(diethylamino)-2-methyl-2-butenyl) lithium, (4-(dibutylamino)-2-methyl-2-butenyl) lithium, (4-(dipropylamino)-2-methyl-2-butenyl) lithium, (4-(diheptylamino)-2-methyl-2-butenyl) lithium, (4-(dihexylamino)-2-methyl-2-butenyl) lithium, (4-(dimethylamino)-3-methyl-2-butenyl) lithium, (4-(diethylamino)-3-methyl-2-butenyl) lithium, (4-(dibutylamino)-3-methyl-2-butenyl) lithium, (4-(dipropylamino)-3-methyl-2-butenyl) lithium, (4-(diheptylamino)-3-methyl-2-butenyl) lithium, (4-(dihexylamino)-3-methyl-2-butenyl) lithium, a reaction product of 1 mol of piperidino lithium and 3 mol of 1,3-butadiene, and a reaction product of 3-N,N-bistrimethylsilylaminopropyl lithium and 3 mol of 1,3-butadiene.

The organolithium compound having at least one nitrogen atom in a molecule is not limited to these and includes analogs thereof as long as they satisfy the above-described conditions. 4-(Dimethylamino)-2-butenyl) lithium, (4-(diethylamino)-2-butenyl) lithium, and (4-(dibutylamino)-2-butenyl) lithium are preferred, and (4-(dibutylamino)-2-butenyl) lithium is more preferred from the viewpoint of reactivity as an initiator and from the viewpoint of chain transfer reaction control described later.

In formula (2), when $R^{12}$ and $R^{13}$ are bonded to each other to form a cyclic structure together with the adjacent nitrogen atom, examples of the organolithium compound represented by formula (2) include (3-(piperidinyl)propyl) lithium, (3-(hexamethyleneiminyl)propyl) lithium, (3-(heptamethyleneiminyl)propyl) lithium, (3-(octamethyleneiminyl)propyl) lithium, (3-(1,3,3-trimethyl-6-azabicyclo[3.2.1]octanyl)propyl) lithium, (3-(1,2,3,6-tetrahydropyridinyl)propyl) lithium, (2-(hexamethyleneiminyl)ethyl) lithium, (4-(hexamethyleneiminyl)butyl) lithium, (5-(hexamethyleneiminyl) pentyl) lithium, (6-(hexamethyleneiminyl)hexyl) lithium, (10-(hexamethyleneiminyl)decyl) lithium, (4-(piperidinyl)-2-butenyl) lithium, (4-(hexamethyleneiminyl)-2-butenyl) lithium, (4-(heptamethyleneiminyl)-2-butenyl) lithium, (4-(octamethyleneiminyl)-2-butenyl) lithium, (4-(1,3,3-trimethyl-6-azabicyclo[3.2.1]octanyl)-2-butenyl) lithium, (4-(1,2,3,6-tetrahydropyridinyl)-2-butenyl) lithium, (4-(hexamethyleneiminyl)-2-methyl-2-butenyl) lithium, and (4-(hexamethyleneiminyl)-3-methyl-2-butenyl) lithium.

The organolithium compound having at least one nitrogen atom in a molecule is not limited to these and includes analogs thereof as long as they satisfy the above-described conditions. (3-(Piperidinyl)propyl) lithium, (3-(hexamethyleneiminyl)propyl) lithium, (3-(1,2,3,6-tetrahydropyridinyl) propyl) lithium, (4-(piperidinyl)-2-butenyl) lithium, and (4-(hexamethyleneiminyl)-2-butenyl) lithium are preferred, (3-(hexamethyleneiminyl)propyl) lithium, (4-(piperidinyl)-2-butenyl) lithium, and (4-(hexamethyleneiminyl)-2-butenyl) lithium are more preferred, and (4-(piperidinyl)-2-butenyl) lithium is further more preferred from the viewpoint of reactivity and an interactive property with an inorganic filler such as carbon or silica, and from the viewpoint of chain transfer reaction control described later.

In formula (3), $R^{12}$ and $R^{13}$ are the same as $R^{12}$ and $R^{13}$ in formula (2). The organolithium compound having at least one nitrogen atom in a molecule represented by formula (3) may be a reaction product of an organomonolithium compound and an organic unsaturated compound having a substituted amino group.

In this case, $R^{20}$ is an organic group derived from the organomonolithium compound, and $R^{19}$ is an alkylene compound derived from the organic unsaturated compound having a substituted amino group. When the organomonolithium compound has a substituted amino group, $R^{20}$ is a hydrocarbon group having a substituted amino group. As the organic unsaturated compound having a substituted amino group, a known organic unsaturated compound having a substituted amino group that causes an addition reaction by a lithium-based initiator is used, and a vinyl aromatic compound having a substituted amino group and a conjugated diene compound having a substituted amino group are included therein.

Examples of the organolithium compound having at least one nitrogen atom in a molecule represented by formula (3) include, but are not limited to, 1-(4-N,N-dimethylaminophenyl)hexyl lithium, 1-(4-N,N-dimethylaminophenyl)-1-phenylhexyl lithium, 1-(4-N,N-dimethylaminomethylphenyl) hexyl lithium, 1-(4-N,N-bistrimethylsilylaminophenyl) hexyl lithium, 1-(4-N-trimethylsilyl-N-ethylaminophenyl) hexyl lithium, 1-(4-N,N-bistrimethylsilylaminophenyl)-1- phenylhexyl lithium, 1-(4-N,N-dimethylaminophenyl)-4-methylpentyl lithium, a reaction product of 1 mol of butyl lithium and 2 mol of 4-N,N-dimethylaminostyrene, a reaction product of 1 mol of sec-butyl lithium and 4 mol of 4-N,N-bistrimethylsilylaminostyrene, a reaction product of 1 mol of butyl lithium and 4 mol of 2-N,N-dimethylamino-1,3-butadiene, a reaction product of 1 mol of piperidino lithium and 2 mol of 4-N,N-dimethylaminostyrene, and a reaction product of 3-N,N-bistrimethylsilylaminopropyl lithium and 2 mol of 4-N,N-dimethylaminostyrene.

Examples of the organolithium compound having at least one nitrogen atom in a molecule represented by the formula (4) include a reaction product of a N-substituted orthotoluidine compound and alkyl lithium.

Examples of the organolithium compound having at least one nitrogen atom in a molecule represented by formula (4) include, but are not limited to, N,N-dimethyl-o-toluidino lithium, N,N-dimethyl-m-toluidino lithium, N,N-dimethyl-p-toluidino lithium, N,N-diethyl-o-toluidino lithium, N,N-diethyl-m-toluidino lithium, N,N-diethyl-p-toluidino lithium, N,N-dipropyl-o-toluidino lithium, N,N-dipropyl-m-toluidino lithium, N,N-dipropyl-p-toluidino lithium, N,N-dibutyl-o-toluidino lithium, N,N-dibutyl-m-toluidino lithium, N,N-dibutyl-p-toluidino lithium, o-piperidinotolueno lithium, p-piperidinotolueno lithium, o-pyrrolidinotolueno lithium, p-pyrrolidinotoluene, N,N,N',N'-tetramethyltoluylenediamino lithium, N,N,N',N'-tetraethyltoluylenediamino lithium, N,N,N',N'-tetrapropyltoluylenediamino lithium, N,N-dimethylxylidino lithium, N,N-diethylxylidino lithium, N,N-dipropylxylidino lithium, N,N-dimethylmesidino lithium, N,N-diethylmesidino lithium, (N,N-dimethylamino)toluylphenylmethylamino lithium, 1-(N,N-dimethylamino)-2-methylnaphtaleno lithium, and 1-(N,N-dimethylamino)-2-methylanthraceno lithium.

The organolithium compound having at least one nitrogen atom in a molecule is not limited to these and includes analogs thereof as long as they satisfy the above-described conditions. N,N-Dimethyl-o-toluidino lithium is more preferred from the viewpoint of polymerization activity.

Examples of the organolithium compound having at least one nitrogen atom in a molecule represented by formula (4) include, but are not limited to, 2-(2-methylpiperidinyl)-1-ethyl lithium (for example, trade name "AI-250" manufactured by FMC Corporation).

The organolithium compound is not limited to these and includes analogs thereof as long as they satisfy the above-described conditions.

Before the polymerization step, the organolithium compound having at least one nitrogen atom in a molecule or other organolithium compounds may be precedently prepared, and any known method can be applied to methods therefor.

In order to obtain a nitrogen-containing conjugated diene-based polymer in the polymerization step mentioned above, the step of copolymerizing at least a conjugated diene compound and a copolymerizable monomer having at least one nitrogen atom in a molecule in the presence of an organolithium compound may be carried out.

As the copolymerizable monomer having at least one nitrogen atom in a molecule, a known organic unsaturated compound having a substituted amino group that is copolymerizable with a conjugated diene compound by a lithium-based initiator is used, and a vinyl aromatic compound having a substituted amino group and a conjugated diene compound having a substituted amino group are included therein.

The organolithium compound is preferably an organomonolithium compound and may or may not have a substituted amino group in a molecule. The organolithium compound is preferably an alkyl lithium compound from the viewpoint of industrial availability and controllability of the polymerization reaction. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium and stilbene lithium. From the viewpoint of the industrial availability and the controllability of the polymerization reaction, the alkyl lithium compound is preferably n-butyllithium or sec-butyllithium.

The substituted amino group is an amino group, each hydrogen of which is independently substituted with at least one group selected from the group consisting of an alkyl group having 1 to 12 carbon atoms, a cycloalkyl group having 3 to 14 carbon atoms, an aralkyl group having 6 to 20 carbon atoms, and a protective group, or the substituents are optionally bonded to each other to form a cyclic structure together with the adjacent nitrogen atom, wherein the substituents represents an alkyl group having 5 to 12 carbon atoms and optionally has an unsaturated bond or a branched structure in a part thereof. The protective group is preferably an alkyl-substituted silyl group.

The vinyl aromatic compound having a substituted amino group as a polymerization monomer includes styrene having a substituted amino group, alkyl-substituted styrene, 1,1-diphenylethylene, and vinylnaphthalene. Examples of the vinyl aromatic compound having a substituted amino group include 4-N,N-dimethylaminostyrene, 4-N,N-diethylaminostyrene, 4-N,N-bistrimethylsilylaminostyrene, 4-N,N-dimethylaminomethylstyrene, 4-(2-N,N-diethylamino)ethylstyrene, 4-N,N-dimethylamino-a-methylstyrene, 1-(4-N,N-dimethylaminophenyl)-1-phenylethylene, and 1-(4-N,N-bistrimethylsilylaminophenyl)-1-phenylethylene.

The conjugated diene compound having a substituted amino group as a polymerization monomer includes a conjugated diene compound having 4 to 12 carbon atoms and having a substituted amino group.

The conjugated diene compound having a substituted amino group includes, for example, 1,3-butadiene, isoprene, 2,3-dimethyl-1,3-butadiene, 1,3-pentadiene, 3-methyl-1,3-pentadiene, 1,3-hexadiene, and 1,3-heptadiene having a substituted amino group. Among these, 1,3-butadiene having a substituted amino group and isoprene having a substituted amino group are preferred from the viewpoint of industrial availability. Examples of the conjugated diene compound having a substituted amino group include 2-dimethylamino-1,3-butadiene, 2-bistrimethylsilylamino-1,3-butadiene, 2-dimethylaminomethyl-1,3-butadiene, and 1-dimethylaminomethyl-1,3-butadiene.

Examples of the polymerization reaction mode employed in the polymerization step include, but are not limited to, batch and continuous polymerization reaction modes.

In the continuous mode, one reactor or two or more connected reactors can be used. As a reactor for the continuous mode, for example, a tank or tubular reactor equipped with a stirrer is used. It is preferable, in the continuous mode, that a monomer, an inert solvent and a polymerization initiator are continuously fed to the reactor, a polymer solution comprising a polymer is obtained in the reactor, and the polymer solution is continuously discharged. As a reactor for the batch mode, for example, a tank reactor equipped with a stirrer is used. It is preferable, in the batch mode, that a monomer, an inert solvent and a polymerization initiator are fed, the monomer is continuously or intermittently additionally fed if necessary during the polymerization, a polymer solution comprising a polymer is obtained in the reactor, and the polymer solution is discharged after completing the polymerization. In the present embodiment, in order to obtain a conjugated diene-based polymer having an active end at a high ratio, the continuous mode in which a polymer can be continuously discharged to be supplied to a next reaction in a short period of time is preferably employed.

In the polymerization step, the monomer is polymerized preferably in an inert solvent.

Examples of the solvent include hydrocarbon-based solvents such as saturated hydrocarbon and aromatic hydrocarbon. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon comprising a mixture of any of these. Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

The polymer solution may comprise a polar compound. Thus, there is a tendency that the polar compound enables an aromatic vinyl compound to be randomly copolymerized with the conjugated diene compound, and can be used as a vinylation agent for controlling a microstructure of a conjugated diene portion. Besides, there is a tendency that it is advantageous for acceleration of the polymerization reaction and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl) propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine. One of these polar compounds may be singly used, or two or more of these may be used together.

The amount of the polar compound to be used is not especially limited but can be selected in accordance with the purpose or the like, and is preferably 0.01 mol or more and 100 mol or less per mol of the polymerization initiator. Such a polar compound (a vinylation agent) can be used, as a microstructure modifier for a conjugated diene portion of the polymer, in an appropriate amount in accordance with a desired amount of vinyl bond. There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block. As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerization step, a polymerization temperature is preferably a temperature at which the living anionic polymerization proceeds, and from the viewpoint of productivity, is more preferably 0° C. or more and further preferably 120° C. or less. If the polymerization temperature falls in this range, there is a tendency that a reaction amount of the modifier reacted to the active end can be sufficiently attained after completing the polymerization. The polymerization temperature is still further preferably 50° C. or more and 100° C. or less, and a temperature of 60° C. or more and 80° C. or less is more suitable.

The conjugated diene-based polymer obtained by the polymerization step before the reaction step has a Mooney viscosity, measured at 110° C., of preferably 10 or more and 90 or less, more preferably 15 or more and 85 or less, and further preferably 20 or more and 60 or less. If the Mooney viscosity falls in this range, the modified conjugated diene-based polymer of the present embodiment tends to be excellent in the processability and the abrasion resistance.

The amount of bound conjugated diene in the conjugated diene-based polymer or the modified conjugated diene-based polymer of the present embodiment is not especially limited, and is preferably 40% by mass or more and 100% by mass or less, and more preferably 55% by mass or more and 80% by mass or less.

Besides, the amount of bound aromatic vinyl in the conjugated diene-based polymer or the modified conjugated diene-based polymer of the present embodiment is not especially limited, and is preferably 0% by mass or more and 60% by mass or less, and more preferably 20% by mass or more and 45% by mass or less.

If the amount of bound conjugated diene and the amount of bound aromatic vinyl respectively fall in the above-described ranges, there is a tendency that the balance between the low hysteresis loss property and the wet skid resistance and the abrasion resistance when in the form of a vulcanizate is more excellent, and practically sufficient fracture characteristics can be obtained. Here, the amount of bound aromatic vinyl can be measured using ultraviolet absorption of a phenyl group, and based on this, the amount of bound conjugated diene can be also obtained. Specifically, these amounts are measured in accordance with a method described in the examples below.

In the conjugated diene-based polymer or the modified conjugated diene-based polymer of the present embodiment, the amount of vinyl bond in a conjugated diene bond unit is not especially limited, and is preferably 10% by mole or more and 75% by mole or less, and more preferably 20% by mole or more and 65% by mole or less.

If the amount of vinyl bond falls in the above-described range, the balance between the low hysteresis loss property and the wet skid resistance and the abrasion resistance when in the form of a vulcanizate and the fracture strength tend to be more excellent. Here, if the modified diene-based polymer is a copolymer of butadiene and styrene, the amount of vinyl bond (the amount of a 1,2-bond) in a butadiene bond unit can be obtained by Hampton method (R. R. Hampton, Analytical Chemistry, 21, 923 (1949)). Specifically, it is measured by a method described in the examples below.

As for the microstructure of the modified conjugated diene-based polymer, it is preferable that the amounts of the aforementioned bonds in the modified conjugated diene-based polymer fall respectively in the above-described ranges and the glass transition temperature of the modified conjugated diene-based polymer is −45° C. or more and −15° C. or less. Thus, there is a tendency that a vulcanizate excellent in rebound resilience can be obtained. The glass transition temperature is defined as a peak top (an inflection point) of a DSC differential curve obtained by recording a DSC curve during temperature increase in a prescribed range in accordance with ISO 22768:2006. Specifically, it is measured in accordance with a method described in the examples below.

If the modified conjugated diene-based polymer of the present embodiment is a conjugated diene-aromatic vinyl copolymer, it preferably comprises a few or no blocks in which 30 or more aromatic vinyl units are chained. More specifically, if the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the copolymer.

If the conjugated diene-based polymer of the present embodiment is a conjugated diene-aromatic vinyl copolymer, a large proportion of an aromatic vinyl unit is preferably present singly. Specifically, if the copolymer is a butadiene-styrene copolymer, when the copolymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5.0% by mass or less. In this case, a resultant vulcanized rubber attains excellent performance of particularly low hysteresis loss.

(Modification Step)

In the modification step, the octa- or higher-functional reactive compound (hereinafter sometimes referred to as the "modifier") is reacted with the active end of the nitrogen-containing conjugated diene-based polymer obtained in the polymerization step, and thus, the modified conjugated diene-based polymer of the present embodiment in which a modifier residue and 8 or more molecules of the conjugated diene-based polymers are bonded is obtained.

<Modifier>

The modifier used in the modification step of the present embodiment is preferably an octa- or higher-functional reactive compound having a nitrogen atom and a silicon atom, and it is more preferable to react a reactive compound having at least three silicon atoms and at least one nitrogen atom in one molecule and having 8 or more reaction active sites.

A modifier having 4 or more alkoxy groups bonded to silicon atoms, having a tertiary amino group, and having 8 or more reaction active sites is further more preferred.

Thus, there is a tendency that the interaction of the polymer with a filler, for example, silica, which is added for obtaining a vulcanizate, is strengthened.

The modifier is further preferably a modifier in which at least one silicon atom constitutes an alkoxysilyl group having 1 to 20 carbon atoms or a silanol group, and the modifier is still further preferably a compound represented by formula (VI) given below.

The modifier in the modification step is more preferably a compound represented by the following general formula (VI):

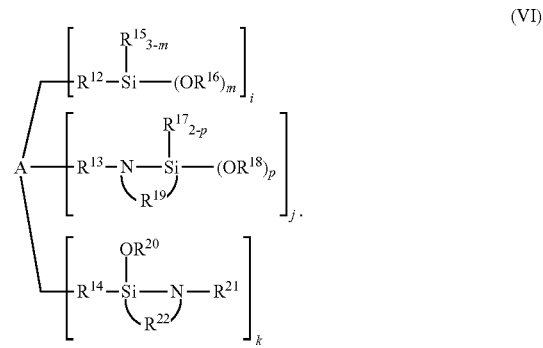

(VI)

In formula (VI), $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group having 1 to 20 carbon atoms or a trialkylsilyl group, m represents an integer of 1 to 3, and p represents 1 or 2. Each of $R^{12}$ to $R^{22}$, m and p, if present in a plural number, is respectively independent, and may be the same as or different from each other. Furthermore, i represents an integer of 0 to 6, j represents an integer of 0 to 6, k represents an integer of 0 to 6, and (i+j+k) is an integer of 4 to 10. Besides, A represents hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

A hydrocarbon group represented by A includes saturated, unsaturated, aliphatic and aromatic hydrocarbon groups. The organic group not having active hydrogen is an organic group not inactivating an active end of the conjugated diene-based polymer. An example of the organic group not having active hydrogen includes an organic group not having a functional group having active hydrogen such as a hydroxyl group (—OH), a secondary amino group (>NH), a primary amino group (—NH$_2$) or a sulfhydryl group (—SH). The organic group not having active hydrogen includes an inactivated form of the functional group having active hydrogen by substitution with a protective group. The protective group is preferably an alkyl-substituted silyl group.

The alkoxysilyl group of the modifier tends to react with, for example, the active end of the nitrogen-containing conjugated diene-based polymer to dissociate alkoxy lithium, and to form a bond between an end of the nitrogen-containing conjugated diene-based polymer chain and silicon of the modifier residue. A value obtained by subtracting the number of SiOR groups reduced through the reaction from the total number of SiOR groups contained in one molecule of the modifier corresponds to the number of alkoxysilyl groups contained in the modifier residue. Besides, an aza-sila cycle group contained in the modifier forms a >N—Li bond and a bond between the end of the nitrogen-containing conjugated diene-based polymer and silicon of the modifier residue. It is noted that the >N—Li bond tends to be easily changed to >NH and LiOH with water or the like used in finishing. Besides, in the modifier, an unreacted and remained alkoxysilyl group tends to be easily changed to silanol (a Si—OH group) with water or the like used in the finishing.

In the modification step, if the active end of 3 mol of the nitrogen-containing conjugated diene-based polymer is reacted with 1 mol of trialkoxysilane group having three alkoxy group per silicon atom, there is a tendency that 1 mol of the alkoxy group remains unreacted although the reaction with the nitrogen-containing conjugated diene-based polymer occurs up to 2 mol. This can be confirmed because 1 mol of the nitrogen-containing conjugated diene-based polymer remains without reacting as an unreacted polymer. Incidentally, if a large amount of alkoxy group is reacted, a condensation reaction occurred during the finishing and storage, which largely changes the viscosity of the polymer, can be inhibited. In particular, the condensation reaction tends to be inhibited if the modified conjugated diene-based polymer comprises 4 or more reaction parts in which 2 mol of the conjugated diene copolymers are reacted with 1 mol of a trialkoxysilane group, namely, the branching degree is 8 or more, and the modified conjugated diene-based copolymer comprises no other reactable alkoxy group.

Examples of the modifier include, but are not limited to, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tetrakis[3-(2,2-dimethoxy-1-aza-2-silacyclopentane)propyl]silane, bis(3-trimethoxysilylpropyl)-bis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, 1-[3-(2,2-dimethoxy-1-aza-2-silacyclopentane)propyl]-3,4,5-tris(3-trimethoxysilylpropyl)-cyclohexane, 3,4,5-tris(3-trimethoxysilylpropyl)-cyclohexyl-[3-(2,2-dimethoxy-1-aza-2-silacyclopentane)propyl]ether, and 3,4,5-tris(3-trimethoxysilylpropyl)-cyclohexyl-bis[3-(2,2-dimethoxy-1-aza-2-silacyclopentane)propyl]phosphate.

A reaction temperature employed in the modification step is preferably a temperature equivalent to the polymerization temperature of the conjugated diene-based polymer, more preferably 0° C. or more and 120° C. or less, and further preferably 50° C. or more and 100° C. or less. Besides, a temperature change after the polymerization step until the addition of the modifier is preferably 10° C. or less, and more preferably 5° C. or less.

A reaction time employed in the modification step is preferably 10 seconds or more, and more preferably 30 seconds or more. A time from the end of the polymerization step to the start of the modification step is preferably shorter, and more preferably 5 minutes or less. Thus, there is a tendency that a high modification ratio can be obtained.

Mixing performed in the modification step may be either mechanical stirring or stirring with a static mixer or the like. If the polymerization step is performed in the continuous mode, the modification step is preferably performed also in the continuous mode. As a reactor used in the modification step, for example, a tank or tubular reactor equipped with a stirrer is used. The modifier may be diluted with an inert solvent and continuously supplied to the reactor. If the polymerization step is performed in the batch mode, the reaction step may be performed by a method in which the polymerization reactor is charged with the modifier, or a method in which the polymer is transferred to another reactor for performing the modification step.

In the formula (VI), A is preferably represented by any one of the following general formulae (II) to (V):

In formula (II), $B^1$ represents a single bond or a hydrocarbon group having 1 to 20 carbon atoms, and a represents an integer of 1 to 10. $B^1$, if present in a plural number, is respectively independent.

In formula (III), $B^2$ represents a single bond or a hydrocarbon group having 1 to 20 carbon atoms, $B^3$ represents an alkyl group having 1 to 20 carbon atoms, and a represents an integer of 1 to 10. Each of $B^2$ and $B^3$, if present in a plural number, is respectively independent.

In formula (IV), $B^4$ represents a single bond or a hydrocarbon group having 1 to 20 carbon atoms, and a represents an integer of 1 to 10. $B^4$, if present in a plural number, is respectively independent.

In formula (V), $B^5$ represents a single bond or a hydrocarbon group having 1 to 20 carbon atoms, and a represents an integer of 1 to 10. $B^5$, if present in a plural number, is respectively independent.

If A in the formula (VI) is represented by any one of formulae (II) to (V), there is a tendency that a modified conjugated diene-based polymer of the present embodiment having more excellent performances can be obtained.

Examples of the modifier in which A in formula (VI) is represented by formula (II) include, but are not limited to, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanediamine, tris[3-(2,2-dimethoxy-1-aza-2-silacyclopentane)propyl]-(3-trimethoxysilylpropyl)-1,3-propanediamine, tetrakis[3-(2,2-dimethoxy-1-aza-2-silacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2- diethoxy-1-aza-2-silacyclopentane)propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-triethoxysilylpropyl)-bis[3-(2,2-diethoxy-1-aza-2-silacyclopentane)propyl]-1,3-bisaminomethylcyclohexane, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tetrakis(3-trimethoxysilylpropyl)-1,6-hexamethylenediamine, pentakis(3-trimethoxysilylpropyl)-diethylenetriamine, tris(3-trimethoxysilylpropyl)-bis[3-(1-ethoxy-2-trimethylsilyl-1-sila-2-azacyclopentane)propyl]-diethylenetriamine and tetrakis(3-trimethoxysilylpropyl)-[3-(1-ethoxy-2-trimethylsilyl-1-sila-2-azacyclopentane)propyl]-diethylenetriamine.

Examples of the modifier in which A in formula (VI) is represented by formula (III) include, but are not limited to, $N^1,N^{1'}$-(propane-1,3-diyl)bis($N^1$-methyl-$N^3$,$N^3$-bis(3-(trimethoxysilyl)propyl)-1,3-propanediamine) and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

Examples of the modifier in which A in formula (VI) is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, bis(3-trimethoxysilylpropyl)-bis[3-(2,2-dimethoxy-1-aza-2-silacyclopentane)propyl]silane, and tris(3-trimethoxysilylpropyl)-[3-(2,2-dimethoxy-1-aza-2-silacyclopentane)propyl]silane.

Examples of the modifier in which A in formula (VI) is represented by formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In formula (VI), A is preferably represented by formula (II) or formula (III), and k represents 0 (zero) Such a modifier tends to be easily available, and the abrasion resistance and the low hysteresis loss performance obtained when the modified conjugated diene-based polymer is made into a vulcanizate tend to be more excellent. Examples of such a modifier include, but are not limited to, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, and tetrakis(3-trimethoxysilylpropyl)-1,3-bisaminomethylcyclohexane.

More preferably, in formula (VI), A is represented by formula (II) or formula (III) and k represents 0 (zero), and in formula (II) or formula (III), a represents an integer of 2 to 10. Thus, the abrasion resistance and the low hysteresis loss performance obtained when vulcanized tend to be more excellent. Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

An addition amount of the compound represented by formula (VI) as the modifier can be adjusted so that the reaction can be performed with a mole number ratio between the conjugated diene-based polymer and the modifier set to a desired stoichiometric ratio, and thus, a desired branching degree tends to be attained. A specific mole number of the polymerization initiator, based on the mole number of the modifier, is preferably 7.0-fold mole or more, and more preferably 8.0-fold mole or more. In this case, in formula (VI), the number of functional groups in the modifier ((m−1)×i+p×j+k) is preferably an integer of 8 to 16, and more preferably an integer of 8 to 14.

As the number of functional groups in the compound represented by formula (VI) is larger, the branching degree of the resultant modified conjugated diene-based polymer is more likely to be shifted from a desired value if the addition amount of the modifier cannot be controlled in a desired range in the reaction step. Accordingly, the addition amount of the modifier is preferably suitably controlled. In order to suitably control the addition amount of the modifier, for example, a method in which the modifier is diluted before the addition is preferably employed. If the shift in the addition amount is the same, a shift between the mole number of the conjugated diene-based polymer and the mole number of the modifier tends to be smaller when it is diluted. Besides, a water content of a solvent used for the dilution is preferably 100 mass ppm or less, more preferably 50 mass ppm or less, further preferably 30 mass ppm or less, and further more preferably 10 mass ppm or less. If the water content of the solvent used for the dilution is 100 mass ppm or less, the modifier and water are reacted to reduce the number of the functional groups in the modifier, and therefore, there is a tendency that the shift between the mole number of the conjugated diene-based polymer and the mole number of the modifier can be suppressed.

In the present embodiment, after the modification step or before the modification step, a condensation reaction step of performing a condensation reaction in the presence of a condensation accelerator can be performed.

The conjugated diene portion of the modified conjugated diene-based polymer of the present embodiment may be hydrogenated, a method for the hydrogenation is not especially limited, and any of known methods can be employed. As a suitable hydrogenation method, a method in which the hydrogenation is performed by blowing gaseous hydrogen into the polymer solution in the presence of a hydrogenation catalyst can be employed. Examples of the catalyst include heterogeneous catalysts such as a catalyst comprising a noble metal supported on a porous inorganic substance; and homogenous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Specific examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the method for producing the modified conjugated diene-based polymer of the present embodiment, a deactivator, a neutralizer or the like may be added if necessary to the resultant copolymer solution after the modification step. Examples of the deactivator include, but are not limited to, water; and alcohols such as methanol, ethanol and isopropanol. Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer, from the viewpoint of preventing gel formation after the polymerization and of improving stability in the processing, a stabilizer for rubber is preferably added. As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

In order to further improve the processability of the modified conjugated diene-based polymer of the present embodiment, an extender oil may be added to the modified conjugated diene-based copolymer if necessary. A preferable example of a method for adding an extender oil to the modified conjugated diene-based polymer includes, but is not limited to, a method in which an extender oil is added to the polymer solution to be mixed, and the resultant oil-extended copolymer solution is desolvated. Examples of the extender oil include an aroma oil, a naphthenic oil and a paraffin oil. Among these oils, from the viewpoint of environmental safety, oil bleeding prevention and wet grip characteristics, an aroma-alternative oil comprising 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

The amount of the extender oil to be added is not especially limited, and is preferably 1 part by mass or more and 60 parts by mass or less, more preferably 5 parts by mass or more and 50 parts by mass or less, and further preferably 10 parts by mass or more and 37.5 parts by mass or less per 100 parts by mass of the modified conjugated diene-based polymer.

As a method for recovering, from the polymer solution, the modified conjugated diene-based polymer of the present embodiment, any of known methods can be employed. Examples of the method include a method in which the polymer is filtered off after separating the solvent by steam stripping and the resultant is dehydrated and dried to recover the polymer, a method in which the solution is concentrated in a flashing tank and the resultant is devolatilized by a vent extruder or the like, and a method in which the solution is directly devolatilized using a drum dryer or the like.

The modified conjugated diene-based polymer of the present embodiment is suitably used as a vulcanizate. Examples of the vulcanizate include a tire, a hose, a shoe sole, an anti-vibration rubber, a vehicle component and a seismic isolation rubber as well as high-impact polystyrene and a resin reinforcing rubber for an ABS resin or the like. In particular, the modified conjugated diene-based polymer is suitably used as a tread rubber composition for a tire. The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a modified conjugated diene-based polymer composition, and vulcanizing the thus obtained composition by heating.

[Rubber Composition]

A rubber composition of the present embodiment comprises a rubber component and a filler in an amount of 5.0 parts by mass or more and 150 parts by mass or less based on 100 parts by mass of the rubber component.

Besides, the rubber component comprises the above-described modified conjugated diene-based polymer of the present embodiment in an amount of 10% by mass or more based on the total amount (100% by mass) of the rubber component.

Furthermore, the filler preferably comprises a silica-based inorganic filler. If a silica-based inorganic filler is dispersed therein, the rubber composition tends to be more excellent in the processability when used for obtaining a vulcanizate. If the rubber composition of the present embodiment is to be used as a vulcanized rubber for a tire, a vehicle component such as an anti-vibration rubber or for shoes or the like, a silica-based inorganic filler is preferably contained.

In the rubber composition, a rubber-like polymer different from the modified conjugated diene-based polymer of the present embodiment (hereinafter simply referred to as the "rubber-like polymer") can be used in combination with the branched modified diene-based polymer of the present embodiment. Examples of such a rubber-like polymer include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber. Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α, β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight average molecular weight of the rubber-like polymer is, from the viewpoint of balance between the performance and the processing characteristics, preferably 2000 or more and 2000000 or less, and more preferably 5000 or more and 1500000 or less. Besides, a rubber-like polymer having a low molecular weight, namely, what is called a liquid rubber, can be used. One of these rubber-like polymers may be singly used, or two or more of these may be used together.

When the rubber composition comprises the modified conjugated diene-based polymer of the present embodiment and the rubber-like polymer, a content (in a mass ratio) of the modified conjugated diene-based polymer to the rubber-like polymer is, in terms of (the modified conjugated diene-based polymer/the rubber-like polymer), preferably 10/90 or more and 100/0 or less, more preferably 20/80 or more and 90/10 or less, and further preferably 50/50 or more and 80/20 or less. Accordingly, the rubber component comprises, based on the total amount (100 parts by mass) of the rubber component, the modified conjugated diene-based polymer in an amount of preferably 10 parts by mass or more and 100 parts by mass or less, more preferably 20 parts by mass or more and 90 parts by mass or less, and further preferably 50 parts by mass or more and 80 parts by mass or less. If the ratio of (the modified conjugated diene-based polymer/the rubber-like polymer) falls in the above-described range, the dispersibility of a filler, for example, silica, when in the form of a vulcanizate tends to be improved.

Examples of the filler include, but are not limited to, a silica-based inorganic filler, carbon black, a metal oxide and a metal hydroxide. Among these, a silica-based inorganic filler is preferred. One of these may be singly used, or two or more of these may be used together.

A content of the filler in the rubber composition is 5.0 parts by mass or more and 150 parts by mass, and preferably 20 parts by mass or more and 100 parts by mass or less based on 100 parts by mass of the rubber component comprising the modified conjugated diene-based polymer. From the viewpoint of exhibiting the effect of the filler addition, the content of the filler is 5.0 parts by mass or more, and from the viewpoint that the filler is sufficiently dispersed to attain practically sufficient processability and mechanical strength of the composition, the content is 150 parts by mass or less.

The silica-based inorganic filler is not especially limited, any of known fillers can be used, a solid particle comprising $SiO_2$ or $Si_3Al$ as a constituent unit is preferred, and a solid particle comprising $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber. Besides, examples include a silica-based inorganic filler having a hydrophobized surface, and a mixture of a silica-based inorganic filler and an inorganic filler excluding silica. Among these, from the viewpoint of the strength and the abrasion resistance, silica and glass fiber are preferred, and silica is more preferred. Examples of the silica include dry silica, wet silica and synthetic silicate silica. Among these silica, wet silica is preferred from the viewpoint that it is excellent in the effect of improving the fracture characteristics and in the balance in the wet skid resistance.

From the viewpoint of obtaining practically good abrasion resistance and fracture characteristics of the rubber composition, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, a specific surface area of 200 $m^2/g$ or more) can be used in combination if necessary. In the present embodiment, if a silica-based inorganic filler having a comparatively large specific surface area (of, for example, 200 $m^2/g$ or more) is used in particular, the modified conjugated diene-based polymer tends to be well balanced between good fracture characteristics and the low hysteresis loss property because the dispersibility of silica can be thus so improved that an effect of improving the abrasion resistance is exhibited in particular.

A content of the silica-based inorganic filler in the rubber composition is 5.0 parts by mass or more and 150 parts mass, and preferably 20 parts by mass or more and 100 parts by mass or less based on 100 parts by mass of the rubber component comprising the modified conjugated diene-based polymer. From the viewpoint of exhibiting the effect of the inorganic filler addition, the content of the silica-based inorganic filler is 5.0 parts by mass or more, and from the viewpoint that the inorganic filler is sufficiently dispersed to obtain practically sufficient processability and mechanical strength of the composition, the content is 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component comprising the modified conjugated diene-based polymer. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle comprising a principal component of a constituent unit represented by MxOy (wherein M represents a metal atom, and x and y each independently represent an integer of 1 to 6). Examples of the metal oxide include, but are not limited to, alumina, titanium oxide, magnesium oxide and zinc oxide. Examples of the metal hydroxide include, but are not limited to, aluminum hydroxide, magnesium hydroxide and zirconium hydroxide.

The rubber composition may comprise a silane coupling agent. The silane coupling agent is preferably a compound that has a function to make close the interaction between the rubber component and the inorganic filler, has a group having affinity with or a binding property to both of the rubber component and the silica-based inorganic filler, and comprises, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the inorganic filler. If the content of the silane coupling agent falls in the aforementioned range, there is a tendency that the effect of the addition of the silane coupling agent can be more conspicuous.

The rubber composition may comprise a rubber softener from the viewpoint of improvement of the processability. As the rubber softener, a mineral oil or a liquid or low molecular weight synthetic softer is suitably used.

A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% or more and 45% or less of the number of all carbon atoms is designated as a naphthene-based softener, and one in which the number of aromatic carbon atoms exceeds 30% of the number of all carbon atoms is designated as an aromatic-based softener.

If the modified conjugated diene-based polymer of the present embodiment is a copolymer of a conjugated diene compound and a vinyl aromatic compound, a rubber softener to be used is preferably one comprising an appropriate aromatic content because such a softener tends to fit with the copolymer.

A content of the rubber softener is preferably 0 part by mass or more and 100 parts by mass or less, more preferably 10 parts by mass or more and 90 parts by mass or less, and further preferably 30 parts by mass or more and 90 parts by mass or less based on 100 parts by mass of the rubber component comprising the modified conjugated diene-based polymer. If the content of the rubber softener is 100 parts by mass or less based on 100 parts by mass of the rubber component, there is a tendency that the bleeding out is suppressed and the stickiness of the surface of the rubber composition is suppressed.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating. Among these methods, the melt-kneading method using a roll, a banbury mixer, a kneader or an extruder is preferred from the viewpoint of productivity and high kneadability. Besides, either of a method in which the rubber component and another filler, a silane coupling agent and an additive are kneaded all together or a method in which the components are mixed dividedly in plural times is applicable.

The rubber composition may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds. The sulfur compounds include sulfur monochloride, sulfur dichloride, disulfide compounds and high molecular weight polysulfide compounds. A content of the vulcanizing agent is preferably 0.01 parts by mass or more and 20 parts by mass or less, and more preferably 0.1 parts by mass or more and 15 parts by mass or less based on 100 parts by mass of the rubber component. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary. As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators. Besides, examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less based on 100 parts by mass of the rubber component.

The rubber composition may comprise, as long as the object of the present embodiment is not impaired, various additives such as other softener and filler excluding those described above, a heat resistance stabilizer, an antistatic agent, a weathering stabilizer, an anti-ageing agent, a colorant and a lubricant. As another softener, any of known softeners can be used. Specific examples of another filler include calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

[Tire]

A tire of the present embodiment comprises the rubber composition of the present embodiment.

The rubber composition of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition of the present embodiment is excellent in the balance between the low hysteresis loss property and the wet skid resistance when in the form of a vulcanizate and in the abrasion resistance, it is more suitably used as a tread of a fuel-efficient tire or a high-performance tire. Besides, it can be expected that the balance between the abrasion resistance and the strain dispersibility (G') at 50° C. is good, the repetitive strain strength is excellent, and the driving stability at the time of high-speed continuous driving is excellent.

EXAMPLES

The present embodiment will now be described in more detail with reference to specific examples and comparative examples, and it is noted that the present embodiment is not limited to the following examples.

The polymers of examples and comparative examples were analyzed by the following methods.
(Physical Property 1) Amount of Bound Styrene A modified conjugated diene-based polymer was used as a sample, 100 mg of the sample was dissolved in chloroform to be diluted to 100 mL, and the resultant was used as a measurement sample.

Based on the absorption of a phenyl group of styrene at the ultraviolet absorption wavelength (in the vicinity of 254 nm), the amount of bound styrene (% by mass) based on 100% by mass of the modified conjugated diene-based polymer used as the sample was measured (spectrophotometer "UV-2450" manufactured by Shimadzu Corporation).
(Physical Property 2) Microstructure of Butadiene Portion (Amount of 1,2-Vinyl Bond)

A modified conjugated diene-based polymer was used as a sample, 50 mg of the sample was dissolved in 10 mL of carbon disulfide, and the resultant was used as a measurement sample.

A solution cell was used to measure an infrared spectrum in a range of 600 to 1000 cm$^{-1}$ using a Fourier transform infrared spectrophotometer "FT-IR230" manufactured by JASCO Corporation, and in accordance with a calculation formula of the Hampton method (a method described by R. R. Hampton, Analytical Chemistry 21, 923 (1949)) based on absorbance at a prescribed wavelength, a microstructure of a butadiene portion, namely, the amount of a 1,2-vinyl bond (mol %) was obtained.
(Physical Property 3) Molecular Weights <Measurement Conditions 1>: A conjugated diene-based polymer or a modified conjugated diene-based polymer was used as a sample to measure a chromatogram using a GPC measurement apparatus (trade name "HLC-8320GPC" manufactured by Tosoh Corporation) including a series of three columns using a polystyrene-based gel as a filler and using an RI detector (trade name "HLC8020" manufactured by Tosoh Corporation), and on the basis of a calibration curve obtained using standard polystyrene, a weight average molecular weight (Mw), a number average molecular weight (Mn), a molecular weight distribution (Mw/Mn), a peak top molecular weight (Mp$_1$) of the modified conjugated diene-based polymer, a peak top molecular weight (Mp$_2$) of the conjugated diene-based polymer, and a ratio therebetween (Mp$_1$/Mp$_2$) were obtained.

As an eluent, THF (tetrahydrofuran) comprising 5 mmol/L of triethylamine was used.

As the columns, three columns available under the trade name "TSKgel SuperMultpore HZ-H" manufactured by Tosoh Corporation were connected to one another, and a guard column available under the trade name "TSKguardcolumn SuperMP (HZ)-H" manufactured by Tosoh Corporation was connected to a previous stage of these.

Ten (10) mg of the sample for the measurement was dissolved in 10 mL of THF to obtain a measurement solution, and 10 μL of the measurement solution was injected into the GPC measurement apparatus for performing the measurement under conditions of an oven temperature of 40° C. and a THF flow rate of 0.35 mL/min.

Among various samples subjected to the measurement under the measurement conditions 1, a sample found to have a value of the molecular weight distribution (Mw/Mn) smaller than 1.6 was subjected to measurement under the following measurement conditions 2. With respect to samples each subjected to the measurement under the measurement conditions 1 and found to have a value of the molecular weight distribution of 1.6 or more, the measurement was performed under the measurement conditions 1.

<Measurement Conditions 2>: A conjugated diene-based polymer or a modified conjugated diene-based polymer was used as a sample to measure a chromatogram using a GPC measurement apparatus including a series of three columns using a polystyrene-based gel as a filler, and on the basis of a calibration curve obtained using standard polystyrene, a weight average molecular weight (Mw), a number average molecular weight (Mn), a peak top molecular weight (Mp$_1$) of the modified conjugated diene-based polymer, a peak top molecular weight (Mp$_2$) of the conjugated diene-based polymer, and a ratio therebetween (Mp$_1$/Mp$_2$) were obtained. As an eluent, THF comprising 5 mmol/L of triethylamine was used. As columns, a guard column available under the trade name "TSKguardcolumn SuperH-H" manufactured by Tosoh Corporation and columns available under the trade names "TSKgel SuperH5000", "TSKgel SuperH6000" and "TSKgel SuperH7000" manufactured by Tosoh Corporation were used. The measurement was performed under conditions of an oven temperature of 40° C. and a THF flow rate of 0.6 mL/min, and an RI detector (trade name "HLC8020" manufactured by Tosoh Corporation) was used. Ten (10) mg of the sample for the measurement was dissolved in 20 mL of THF to obtain a measurement solution, and 20 μL of the measurement solution was injected into the GPC measurement apparatus for performing the measurement. With respect to samples each subjected to the measurement under the measurement conditions 1 and found to have a value of the molecular weight distribution smaller than 1.6, the measurement was performed under the measurement conditions 2.

The peak top molecular weights (Mp$_1$ and Mp$_2$) were obtained as follows.

On a GPC curve obtained by the measurement, a peak detected as a highest molecular weight component was selected. With respect to the selected peak, a molecular weight corresponding to the maximum value of the peak was calculated to be defined as a peak top molecular weight.
(Physical Property 4) Shrinking Factor (g')

Measurement was performed by using a modified conjugated diene-based polymer as a sample, using a GPC measurement apparatus (trade name "GPCmax VE-2001" manufactured by Malvern) including a series of three columns using a polystyrene-based gel as a filler, and using three detectors connected in order of a light scattering detector, an RI detector and a viscosity detector (trade name "TDA305" manufactured by Malvern), and on the basis of standard polystyrene, an absolute molecular weight was obtained based on results obtained by the light scattering detector and the RI detector, and an intrinsic viscosity was obtained based on results obtained by the RI detector and the viscosity detector.

Assuming that a straight chain polymer has an intrinsic viscosity [η] complying with the expression of intrinsic viscosity [η]=−3.883 M$^{0.771}$, a shrinking factor (g') as a ratio in the intrinsic viscosity corresponding to each molecular weight was calculated. In the above-described formula, M is the absolute molecular weight.

As an eluent, THF comprising 5 mmol/L of triethylamine was used. As columns, columns available under the trade names "TSKgel G4000HXL", "TSKgel G5000HXL" and "TSKgel G6000HXL" manufactured by Tosoh Corporation connected to one another were used. Twenty (20) mg of the sample for the measurement was dissolved in 10 mL of THF to obtain a measurement solution, and 100 µL of the measurement solution was injected into the GPC measurement apparatus for performing the measurement under conditions of an oven temperature of 40° C. and a THF flow rate of 1 mL/min.

(Physical Property 5) Mooney Viscosity of Polymer

A conjugated diene-based polymer or a modified conjugated diene-based polymer was used as a sample, and a Mooney viscosity was measured using a Mooney viscometer (trade name "VR1132" manufactured by Ueshima Seisakusho Co., Ltd.) and using an L-type rotor in accordance with JIS K6300.

A measurement temperature was set to 110° C. when the sample was a conjugated diene-based polymer, and was set to 100° C. when the sample was a modified conjugated diene-based polymer.

First, the sample was preheated for 1 minute at a test temperature, the rotor was rotated at 2 rpm, and a torque measured 4 minutes after was defined as a Mooney viscosity ($ML_{(1+4)}$).

Then, as for the modified conjugated diene-based polymer as the sample, the rotation of the rotor was immediately terminated, the torque was recorded at a Mooney unit per 0.1 seconds from 1.6 to 5 seconds after the termination, the slope of a straight line in double logarithmic plot of the torque and the time (sec) was determined, and the absolute value thereof was defined as a Mooney stress relaxation (MSR).

(Physical Property 6) Glass Transition Temperature (Tg)

A modified conjugated diene-based polymer was used as a sample to record a DSC curve in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature.

(Physical Property 7) Modification Ratio

A modified conjugated diene-based polymer was used as a sample, and measurement was performed by applying a characteristic that a modified basic polymer component adsorbs to a GPC column using a silica-based gel as a filler.

A chromatogram obtained by measurement using a polystyrene-based column and a chromatogram obtained by measurement using a silica-based column were obtained by using a sample solution comprising the sample and low molecular weight internal standard polystyrene, and based on a difference between these chromatograms, an adsorption amount to the silica-based column was measured to obtain a modification ratio.

Specifically, the measurement was performed as described below.

Preparation of Sample Solution

Ten (10) mg of a sample and 5 mg of standard polystyrene were dissolved in 20 mL of THF to obtain a sample solution.

GPC Measurement Conditions using Polystyrene-based Column

An apparatus available under the trade name of "HLC-8320GPC" manufactured by Tosoh Corporation was used, THF comprising 5 mmol/L of triethylamine was used as an eluent, and 10 µL of the sample solution was injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" manufactured by Tosoh Corporation were connected to one another, and a guard column available under the trade name "TSKguardcolumn SuperMP (HZ)-H" manufactured by Tosoh Corporation was connected to a previous stage of these.

GPC Measurement Conditions using Silica-based Column

An apparatus available under the trade name of "HLC-8320GPC" manufactured by Tosoh Corporation was used, THF was used as an eluent, and 50 µL of the sample solution was injected into the apparatus to obtain a chromatogram by using an RI detector under conditions of a column oven temperature of 40° C. and a THF flow rate of 0.5 ml/min.

Columns available under the trade names "Zorbax PSM-1000S", "PSM-300S" and "PSM-60S" were connected to one another to be used, and a guard column available under the trade name "DIOL 4.6×12.5 mm 5 micron" was connected to a previous stage of these to be used.

Calculation Method for Modification Ratio

Assuming that the whole peak area was 100, the peak area of the sample was P1 and the peak area of standard polystyrene was P2 in the chromatogram obtained by using the polystyrene-based column, and that the whole peak area was 100, the peak area of the sample was P3 and the peak area of standard polystyrene was P4 in the chromatogram obtained by using the silica-based column, a modification ratio (%) was obtained in accordance with the following expression:

$$\text{Modification Ratio (\%)} = [1-(P2 \times P3)/(P1 \times P4)] \times 100$$

wherein P1+P2=P3+P4=100.

(Physical Property 8) Nitrogen Atom Content (Mass ppm)

A modified conjugated diene-based polymer was used as a sample to perform measurement in accordance with JIS-2609: Standard Test Method for the Determination of Nitrogen in Crude Petroleum and Petroleum Products by chemiluminescence detection.

The measurement apparatus used was a trace total nitrogen analysis apparatus ("TN-2100H" manufactured by Mitsubishi Chemical Analytech Co., Ltd.).

As a measurement method, the sample was pyrolyzed under a flow of argon gas and then subjected to oxidative combustion with oxygen gas, nitrogen monoxide thus generated was subjected to oxidation reaction with ozone gas under dehydration conditions, the emission intensity detected in 590 to 2500 nm was measured, and the nitrogen content was determined from the area of the emission intensity.

(Physical Property 9) Presence of Silicon Atom

Measurement was performed by using 0.5 g of a modified conjugated diene-based polymer as a sample and using a ultraviolet visible spectrophotometer (trade name "UV-1800" manufactured by Shimadzu Corporation) in accordance with JIS K 0101 44.3.1, and quantitative determination was performed by a molybdenum blue-spectrophotometric method.

As a result, if a silicon atom was detected (low detection limit: 10 mass ppm), it was determined that the sample had a silicon atom.

Thus, it was confirmed that each of the modified conjugated diene-based polymers of Examples and Comparative Examples had a silicon atom.

[Example 1] Modified Conjugated Diene-Based Polymer (Sample 1)

Two tank reactors equipped with a stirrer, that is, two tank pressure vessels including a stirrer and a jacket for temperature control, which had an internal volume of 10 L, had a ratio (L/D) between the internal height (L) and the internal diameter (D) of 4.0 and had an inlet in a bottom portion and an outlet in a top portion, were connected and used as a polymerization reactor.

1,3-Butadiene, styrene and n-hexane, from which water had been precedently eliminated, were mixed respectively at rates of 22.3 g/min, 12.5 g/min and 214 g/min. In a static mixer provided in the middle of a pipe used for supplying the thus obtained mixed solution to the inlet of the first reactor, n-butyl lithium for performing a treatment for inactivating a remaining impurity was added at a rate of 0.109 mmol/min to be mixed, and the resultant mixed solution was continuously supplied to the bottom portion of the first reactor.

In addition, a polar substance of 2,2-bis(2-oxolanyl) propane and a polymerization initiator of a precedently prepared mixed solution of piperidino lithium (abbreviated as "LA-1" in the table) and n-butyl lithium (molar ratio: piperidino lithium:n-butyl lithium=0.72:0.28, obtained by preparing piperidine and n-butyl lithium at a molar ratio of piperidine:n-butyl lithium=0.72:1.00) were supplied respectively at rates of 0.0281 g/min and 0.272 mmol (molar ratio of lithium)/min to the bottom portion of the first polymerization reactor in which the mixed solution was vigorously stirred by the stirrer, so as to continuously perform a polymerization reaction.

The temperature was controlled so that a temperature of a polymer solution in the outlet in the top portion of the first reactor could be 65° C. Since the top portion of the first reactor was connected to the bottom portion of the second reactor, the polymer solution was continuously supplied from the top portion of the first reactor to the bottom portion of the second reactor. The temperature was controlled so that a temperature of a polymer in the outlet in the top portion of the second reactor could be 70° C. When the polymerization was sufficiently stabilized, a small amount of the polymer solution prior to addition of a modifier was taken out through the outlet disposed in the top portion of the second reactor, an antioxidant (BHT) was added thereto in a ratio of 0.2 g per 100 g of the resultant polymer, the solvent was then removed, and a Mooney viscosity at 110° C. and various molecular weights of the conjugated diene-based polymer were measured.

Next, to the polymer solution flown out through the outlet of the second reactor, a modifier of tetrakis(3-trimethoxysilylpropyl)-1,3-propanediamine (abbreviated as "A" in the table) having been diluted to 2.74 mmol/L was continuously added in a rate of 0.0359 mmol/min (a n-hexane solution comprising 4.8 ppm of water), and the polymer solution to which the modifier had thus been added was mixed in passing through the static mixer to cause modification.

Here, a time up to the addition of the modifier to the polymer solution flown out from the outlet of the reactor was 4.7 min, a temperature was 65° C., and a difference between the temperature in the polymerization step and the temperature up to the addition of the modifier was 5° C.

To the polymer solution in which the modification had been caused, an antioxidant (BHT) was continuously added at a rate of 0.055 g/min (a n-hexane solution) in a ratio of 0.2 g per 100 g of the resultant polymer so as to complete the modification reaction.

At the same time as the addition of the antioxidant, an oil (JOMO Process NC140 manufactured by JX Nippon Mining & Metals Corporation) was continuously added in a ratio of 25.0 g per 100 g of the resultant polymer, and the resultant was mixed by the static mixer.

The solvent was removed by the steam stripping to obtain a modified conjugated diene-based polymer (sample 1).

[Example 2] Modified Conjugated Diene-Based Polymer (Sample 2)

A modified conjugated diene-based polymer (sample 2) was obtained under the same conditions as in [Example 1] above except that the polymerization initiator was changed from piperidino lithium to hexamethyleneimino lithium (abbreviated as "LA-2" in the table).

[Example 3] Modified Conjugated Diene-Based Polymer (Sample 3)

A modified conjugated diene-based polymer (sample 3) was obtained under the same conditions as in [Example 1] above except that the modifier was changed from tetrakis (3-trimethoxysilylpropyl)-1,3-propanediamine to tetrakis(3-triethoxysilylpropyl)-1,3-propanediamine (abbreviated as "B" in the table).

[Example 4] Modified Conjugated Diene-Based Polymer (Sample 4)

A modified conjugated diene-based polymer (sample 4) was obtained under the same conditions as in [Example 1] above except that the polymerization initiator was changed from piperidino lithium to hexamethyleneimino lithium (abbreviated as "LA-2" in the table), and the modifier was changed from tetrakis(3-trimethoxysilylpropyl)-1,3-propanediamine to tetrakis(3-triethoxysilylpropyl)-1,3-propanediamine (abbreviated as "B" in the table).

[Example 5] Modified Conjugated Diene-Based Polymer (Sample 5)

A modified conjugated diene-based polymer (sample 5) was obtained under the same conditions as in [Example 1] above except that the addition amount of the polymerization initiator was changed from 0.272 mmol/min to 0.219 mmol/min, the addition amount of the polar substance was changed from 0.0281 g/min to 0.0230 g/min, and the addition amount of the modifier was changed from 0.0359 mmol/min to 0.0275 mmol/min.

[Example 6] Modified Conjugated Diene-Based Polymer (Sample 6)

A modified conjugated diene-based polymer (sample 6) was obtained under the same conditions as in [Example 1] above except that the addition amount of the polymerization initiator was changed from 0.272 mmol/min to 0.399 mmol/min, the addition amount of the polar substance was changed from 0.0281 g/min to 0.0427 g/min, and the addition amount of the modifier was changed from 0.0359 mmol/min to 0.0501 mmol/min.

[Example 7] Modified Conjugated Diene-Based Polymer (Sample 7)

A temperature-controllable autoclave having an internal volume of 5 L and equipped with a stirrer and a jacket was used as a rector.

1670 g of normal hexane, 112 g of styrene, 207 g of 1,3-butadiene and 0.265 g of 2,2-bis(2-oxolanyl) propane used as a polar substance, from which impurities had been precedently eliminated, were put in the reactor.

Polymerization was started by adding a polymerization initiator of piperidino lithium (abbreviated as "LA-3" in the table) precedently obtained by a reaction of 3.57 mmol of piperidino lithium and 3.57 mmol of n-normal butyl lithium when the inside temperature of the reactor was 56° C.

Immediately after starting the polymerization, the inside temperature of the reactor increased, and when the temperature reached to a peak temperature which was 78° C.

When the temperature was found to start lowering, 0.378 mmol of a modifier of tetrakis(3-trimethoxysilylpropyl)-1,3-propanediamine (abbreviated as "A" in the table) was added thereto, followed by stirring for another 10 minutes.

The modifier was added 2 minutes after the inside temperature reached to a peak temperature.

As a polymerization terminator, 3.57 mmol of ethanol was added thereto to terminate the reaction, and thus, a polymer solution comprising a modified conjugated diene-based polymer was obtained.

To the thus obtained polymer solution comprising a modified conjugated diene-based polymer, 0.64 g of an antioxidant of 2,6-di-tert-butyl-4-hydroxytoluene was added, and the solvent was removed by the steam stripping to obtain a modified conjugated diene-based copolymer 7 (sample 7) through vacuum drying.

[Example 15] Modified Conjugated Diene-Based Polymer (Sample 11)

A modified conjugated diene-based polymer (sample 11) was obtained under the same conditions as in [Example 5] above except that the molar ratio between piperidino lithium and n-butyl lithium as a polymerization initiator was set to 0.35:0.65 (abbreviated as "LA-4" in the table), and the addition amount of the modifier was changed to 0.0247 mmol/min.

[Example 16] Modified Conjugated Diene-Based Polymer (Sample 12)

A modified conjugated diene-based polymer (sample 12) was obtained under the same conditions as in [Example 7] above except that 1.5 mmol of piperidino lithium and 3.57 mmol of normal butyl lithium were used as a polymerization initiator (abbreviated as "LA-5" in the table), and the addition amount of the modifier was changed to 0.265 mmol.

[Comparative Example 1] Modified Conjugated Diene-Based Polymer (Sample 8)

A modified conjugated diene-based polymer (sample 8) was obtained under the same conditions as in [Example 1] above except that the addition amount of the polymerization initiator was changed from 0.272 mmol/min to 0.343 mmol/min, the addition amount of the polar substance was changed from 0.0281 g/min to 0.0354 g/min, the modifier was changed from tetrakis(3-trimethoxysilylpropyl)-1,3-propanediamine to bis(3-trimethoxysilylpropyl)-N-methylamine (abbreviated as "C" in the table), and the addition amount of the modifier was changed from 0.0359 mmol/min to 0.0903 mmol/min.

[Comparative Example 2] Modified Conjugated Diene-Based Polymer (Sample 9)

A modified conjugated diene-based polymer (sample 9) was obtained under the same conditions as in [Example 1] above except that the addition amount of the polymerization initiator was changed from 0.272 mmol/min to 0.234 mmol/min, the addition amount of the polar substance was changed from 0.0281 g/min to 0.0242 g/min, the modifier was changed from tetrakis(3-trimethoxysilylpropyl)-1,3-propanediamine to bis(3-trimethoxysilylpropyl)-N-methylamine (abbreviated as "C" in the table), and the addition amount of the modifier was changed from 0.0359 mmol/min to 0.0616 mmol/min.

[Comparative Example 3] Modified Conjugated Diene-Based Polymer (Sample 10)

A modified conjugated diene-based polymer (sample 10) was obtained under the same conditions as in [Example 1] above except that the polymerization initiator was changed from piperidino lithium to normal butyl lithium (abbreviated as "NBL" in the table), the addition amount of the polymerization initiator was changed from 0.272 mmol/min to 0.288 mmol/min, the addition amount of the polar substance was changed from 0.0281 g/min to 0.0298 g/min, and the addition amount of the modifier was changed from 0.0359 mmol/min to 0.0378 mmol/min.

[Comparative Example 7] Modified Conjugated Diene-Based Polymer (Sample 13)

A modified conjugated diene-based polymer (sample 13) was obtained under the same conditions as in [Example 1] above except that the addition amount of the polar substance was set to 0.0263 g/min, the addition amount of the polymerization initiator was set to 0.253 mmol/min, and a modifier of 1,3,5-tris(3-trimethoxysilylpropyl) isocyanurate (abbreviated as "D" in the table) was added at a rate of 0.0422 mmol/min.

TABLE 1

| | | Example 1 | Example 2 | Example 3 | Example 4 | Example 5 | Example 6 | Example 7 | Example 15 |
|---|---|---|---|---|---|---|---|---|---|
| Polymerization conditions | Modified conjugated diene-based polymer (sample No.) | 1 | 2 | 3 | 4 | 5 | 6 | 7 | 11 |
| | Butadiene (g/min) | 22.3 | 22.3 | 22.3 | 22.3 | 22.3 | 22.3 | 207 g | 22.3 |
| | Styrene (g/min) | 12.5 | 12.5 | 12.5 | 12.5 | 12.5 | 12.5 | 112 g | 12.5 |
| | n-Hexane (g/min) | 214 | 214 | 214 | 214 | 214 | 214 | 1670 g | 214 |
| | Polymerization temperature of first reactor (° C.) | 65 | 65 | 65 | 65 | 65 | 65 | Peak temperature 78° C. | 65 |
| | Polymerization temperature of second reactor (° C.) | 70 | 70 | 70 | 70 | 70 | 70 | | 70 |
| | Treated n-butyl lithium (mmol/min) | 0.109 | 0.109 | 0.109 | 0.109 | 0.109 | 0.109 | 0 | 0.109 |
| Polymerization initiator | Type | LA-1 | LA-2 | LA-1 | LA-2 | LA-1 | LA-1 | LA-3 | LA-4 |
| | Addition amount (mmol/min) | 0.272 | 0.272 | 0.272 | 0.272 | 0.219 | 0.399 | 3.57 mmol | 0.219 |
| | Addition amount of polar substance (g/min) | 0.0281 | 0.0281 | 0.0281 | 0.0281 | 0.0230 | 0.0427 | 0.265 g | 0.0230 |
| Modifier | Type | A | A | B | B | A | A | A | A |
| | Addition amount (mmol/min) | 0.0359 | 0.0359 | 0.0359 | 0.0359 | 0.0275 | 0.0501 | 0.378 mmol | 0.0247 |
| Physical property values | Conjugated diene-based polymer (Physical property 3) Weight average molecular weight (10⁴ g/mol) | 34.0 | 36.5 | 34.7 | 36.5 | 43.5 | 25.9 | 15.6 | 42.3 |
| | (Physical property 3) Number average molecular weight (10⁴ g/mol) | 18.9 | 19.2 | 19.3 | 19.0 | 23.5 | 12.9 | 15.9 | 22.4 |
| | (Physical property 5) Mooney viscosity (110° C.) | 42 | 45 | 43 | 42 | 71 | 24 | not available | 68 |
| | (Physical property 3) Peak top molecular weight Mp₂ (10⁴ g/mol) | 29.8 | 30.6 | 30.0 | 30.3 | 36.8 | 22.4 | 16.4 | 36.2 |
| | (Physical property 3) Mw/Mn | 1.81 | 1.90 | 1.80 | 1.92 | 1.85 | 1.99 | 1.02 | 1.89 |
| | (Physical property 1) Amount of bound styrene (% by mass) | 35 | 35 | 35 | 35 | 35 | 35 | 35 | 35 |
| | (Physical property 2) Amount of vinyl bond (amount of 1,2-bond) (mol %) | 40 | 41 | 40 | 40 | 41 | 40 | 40 | 41 |
| Modified conjugated diene-based polymer | (Physical property 3) Weight average molecular weight (10⁴ g/mol) | 88.9 | 92.1 | 88.4 | 87.7 | 114.1 | 65.4 | 60.8 | 101.2 |
| | (Physical property 3) Number average molecular weight (10⁴ g/mol) | 43.7 | 42.2 | 44.0 | 39.5 | 56.8 | 31.7 | 40.8 | 51.3 |

TABLE 1-continued

|  |  |  |  |  |  |  |  |  |  |  |  |
|---|---|---|---|---|---|---|---|---|---|---|---|
| (Physical property 3) Peak top molecular weight Mp₁ | (10⁴ g/mol) | 98.1 | 100.5 | 96.3 | 94.9 | 120.3 | 69.3 | 71.7 | 106.5 |
| (Physical property 3) Mw/Mn |  | 2.04 | 2.18 | 2.01 | 2.22 | 2.01 | 2.07 | 1.49 | 1.97 |
| (Physical property 3) Mp₁/Mp₂ |  | 3.29 | 3.28 | 3.21 | 3.13 | 3.27 | 3.09 | 4.36 | 2.94 |
| Branching degree |  | 8 | 8 | 8 | 8 | 8 | 8 | 8 | 8 |
| The number of SiOR residues |  | 4 | 4 | 4 | 4 | 4 | 4 | 4 | 4 |
| (Physical property 4) Shrinking factor (g') |  | 0.55 | 0.57 | 0.56 | 0.58 | 0.54 | 0.58 | 0.52 | 0.59 |
| (Physical property 5) Mooney viscosity of polymer (100° C.) |  | 82 | 85 | 80 | 79 | 100 | 52 | 62 | 93 |
| (Physical property 5) Mooney stress relaxation |  | 0.28 | 0.27 | 0.29 | 0.31 | 0.27 | 0.34 | 0.82 | 0.38 |
| (Physical property 6) Glass transition temperature | (° C.) | −25 | −24 | −25 | −25 | −24 | −25 | −25 | −24 |
| (Physical property 7) Modification ratio | (%) | 93.1 | 90.2 | 91.8 | 89.8 | 88.9 | 88.4 | 92.4 | 80.0 |
| (Physical property 8) Nitrogen atom content | mass ppm | 102 | 99 | 103 | 102 | 80 | 144 | 153 | 59 |

|  |  |  | Example 16 | Comparative Example 1 | Comparative Example 2 | Comparative Example 3 | Comparative Example 7 |
|---|---|---|---|---|---|---|---|
| Polymerization conditions | Modified conjugated diene-based polymer (sample No.) |  | 12 | 8 | 9 | 10 | 13 |
|  | Butadiene | (g/min) | 207 g | 22.3 | 22.3 | 22.3 | 22.3 |
|  | Styrene | (g/min) | 112 g | 12.5 | 12.5 | 12.5 | 12.5 |
|  | n-Hexane | (g/min) | 1670 g | 214 | 214 | 214 | 214 |
|  | Polymerization temperature of first reactor | (° C.) | Peak temperature 78° C. | 65 | 65 | 65 | 65 |
|  | Polymerization temperature of second reactor | (° C.) |  | 70 | 70 | 70 | 70 |
| Polymerization initiator | Treated n-butyl lithium | (mmol/min) | 0 | 0.109 | 0.109 | 0.109 | 0.109 |
|  | Type |  | LA-5 | LA-1 | LA-1 | NBL | LA-1 |
|  | Addition amount | (mmol/min) | 3.57 mmol | 0.343 | 0.234 | 0.288 | 0.253 |
| Modifier | Addition amount of polar substance | (g/min) | 0.265 g | 0.0354 | 0.0242 | 0.0298 | 0.0263 |
|  | Type |  | A | C | C | A | D |
|  | Addition amount | (mmol/min) | 0.265 g | 0.0903 | 0.0616 | 0.0378 | 0.0422 |
| Physical property values | Conjugated diene-based polymer (Physical property 3) Weight average molecular weight | (10⁴ g/mol) | 20.3 | 27.2 | 41.5 | 35.8 | 37.2 |

TABLE 1-continued

|  | | | | | | | |
|---|---|---|---|---|---|---|---|
| Modified conjugated diene-based polymer | (Physical property 3) Number average molecular weight | (10⁴ g/mol) | 19.7 | 14.2 | 21.8 | 16.6 | 20.1 |
| | (Physical property 5) Mooney viscosity (110° C.) | | not available | 28 | 54 | 44 | 50.3 |
| | (Physical property 3) Peak top molecular weight Mp₂ | (10⁴ g/mol) | 20.9 | 24.4 | 36.5 | 30.9 | 33.2 |
| | (Physical property 3) Mw/Mn | | 1.03 | 1.92 | 1.90 | 2.16 | 1.85 |
| | (Physical property 1) Amount of bound styrene | (% by mass) | 35 | 35 | 35 | 35 | 35 |
| | (Physical property 2) Amount of vinyl bond (amount of 1,2-bond) | (mol %) | 40 | 39 | 40 | 41 | 40 |
| | (Physical property 3) Weight average molecular weight | (10⁴ g/mol) | 66.5 | 47.6 | 72.6 | 85.2 | 78.1 |
| | (Physical property 3) Number average molecular weight | (10⁴ g/mol) | 40.8 | 22.6 | 34.6 | 38.2 | 38.1 |
| | (Physical property 3) Peak top molecular weight Mp₁ | (10⁴ g/mol) | 70.7 | 45.8 | 69.7 | 96.8 | 85.4 |
| | (Physical property 3) Mw/Mn | | 1.63 | 2.11 | 2.10 | 2.23 | 2.05 |
| | (Physical property 3) Mp₁/Mp₂ | | 3.38 | 1.88 | 1.91 | 3.13 | 2.57 |
| | Branching degree | | 8 | 4 | 4 | 8 | 6 |
| | The number of SiOR residues | | 4 | 2 | 2 | 4 | 3 |
| | (Physical property 4) Shrinking factor (g') | | 0.58 | 0.77 | 0.75 | 0.57 | 0.63 |
| | (Physical property 5) Mooney viscosity of polymer (100° C.) | | 64 | 56 | 85 | 84 | 85 |
| | (Physical property 5) Mooney stress relaxation | | 0.81 | 0.47 | 0.37 | 0.30 | 0.34 |
| | (Physical property 6) Glass transition temperature | (° C.) | −25 | −25 | −25 | −24 | −25 |
| | (Physical property 7) Modification ratio | (%) | 79.0 | 87.9 | 89.4 | 80.3 | 88.3 |
| | (Physical property 8) Nitrogen atom content | mass ppm | 65 | 130 | 85 | 24 | 122 |

The "branching degree" shown in Table 1 refers to the number of branches estimated based on the number of functional groups of and the addition amount of the modifier, and can be checked also based on the value of the shrinking factor.

The "number of SiOR residues" shown in Table 1 refers to a value obtained by subtracting the number of SiOR groups reduced through the reaction from the total number of SiOR groups contained in one molecule of the modifier. Here, R represents a hydrogen atom or an alkyl group having 1 to 20 carbon atoms.

[Examples 8 to 14, 17 and 18] and [Comparative Examples 4 to 6 and 8]

The samples 1 to 13 shown in Table 1 were used as starting material rubbers, and rubber compositions respectively comprising the starting material rubbers were obtained in accordance with the following compositions:

Modified conjugated diene-based polymer (any of the samples 1 to 13): 100 parts by mass (oil removed)
Silica (trade name "Ultrasil 7000GR" manufactured by Evonik Degussa Gmbh, nitrogen adsorption specific surface area: 170 m$^2$/g): 75.0 parts by mass
Carbon black
(trade name "SEAST KH (N339)" manufactured by Tokai Carbon Co., Ltd.): 5.0 parts by mass
Silane coupling agent (trade name "Si75" manufactured by Evonik Degussa Gmbh, bis(triethoxysilylpropyl)disulfide): 6.0 parts by mass
S-RAE oil
(trade name "Process NC140" manufactured by JX Nippon Mining & Metals Corporation): 37.5 parts by mass
Zinc oxide: 2.5 parts by mass
Stearic acid: 1.0 part by mass
Anti-ageing agent: (N-(1,3-dimethylbutyl)-N'-phenyl-p-phenylenediamine): 2.0 parts by mass
Sulfur: 2.2 parts by mass
Vulcanization accelerator 1 (N-cyclohexyl-2-benzothiazyl sulfinamide): 1.7 parts by mass
Vulcanization accelerator 2 (diphenylguanidine): 2.0 parts by mass
Total: 239.4 parts by mass The above-described materials were kneaded as follows to obtain a rubber composition.

A sealed mixer (internal volume: 0.3 L) equipped with a temperature controller was used, and as a first stage of kneading, the starting material rubber (any of the samples 1 to 13), the fillers (the silica and the carbon black), the silane coupling agent, the process oil, the zinc oxide and the stearic acid were kneaded under conditions of a filling rate of 65% and a rotator rotational speed of 30 to 50 rpm. Here, the temperature of the sealed mixer was controlled to obtain the rubber composition (compound) at a discharging temperature of 155 to 160° C.

Next, as a second stage of the kneading, the compound obtained as described above was cooled to room temperature, the antioxidant was added thereto, and the resultant was kneaded again to improve the dispersibility of the silica. Also in this case, the discharging temperature for the compound was adjusted to 155 to 160° C. by the temperature control of the mixer.

After the cooling, as a third stage of the kneading, sulfur and the vulcanization accelerators 1 and 2 were added to and mixed with the resultant compound by an open roll set to 70° C.

Thereafter, the resultant was molded and vulcanized at 160° C. for 20 minutes by a vulcanizing press.

The rubber composition was evaluated before and after the vulcanization.

Specifically, the evaluation was performed by methods described below. Evaluation results are shown in Table 2.

[Evaluation 1] Mooney Viscosity of Compound

The compound obtained as described above after the second stage of the kneading and before the third stage of the kneading was used as a sample, and the viscosity was measured using a Mooney viscometer in accordance with JIS K6300-1 after preheating the sample at 130° C. for 1 minute, and after rotating a rotor for 4 minutes at 2 rpm.

Results are shown as indexes obtained assuming that the result of Comparative Example 5 was 100.

A smaller index indicates better processability.

[Evaluation 2] Viscoelasticity Parameter and Strain Dispersibility

A viscoelasticity testing machine "ARES" manufactured by Rheometric Scientific, Inc. was used to measure a viscoelasticity parameter in a torsion mode.

Each measurement value was shown as an index obtained assuming that the result of the rubber composition of Comparative Example 5 was 100.

A tan δ measured at 0° C. at a frequency of 10 Hz and strain of 1% was used as an index of the wet grip characteristics.

A larger index indicates better wet grip characteristics.

Besides, a tan δ measured at 50° C. at a frequency of 10 Hz and strain of 3% was used as an index of low hysteresis loss property.

A smaller index indicates better low hysteresis loss property.

Besides, the difference between the tan δ measured at 50° C. at a frequency of 10 Hz and strain of 0.1% and the tan δ measured at 50° C. at a frequency of 10 Hz and strain of 10% was used as an index of strain dispersibility (G') A smaller value of the index means better strain dispersibility.

[Evaluation 3] Tensile Strength and Tensile Elongation

The tensile strength and the tensile elongation were measured in accordance with a tensile test of JIS K6251, and results are shown as indexes obtained assuming that the result of Comparative Example 5 was 100.

A larger index indicates better tensile strength and better tensile elongation.

[Evaluation 4] Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results are shown as indexes obtained assuming that the result of Comparative Example 5 was 100.

A larger index indicates better abrasion resistance.

[Evaluation 5] Repetitive Strain Strength

A dumbbell-shaped test specimen was repetitively elongated and contracted at a constant rate and a constant stroke in accordance with JIS K 6270 using a constant elongation fatigue tester manufactured by MYS-TESTER Co., Ltd., and the number of times of elongation and contraction when the test specimen was broken was measured. A larger value of the index means better repetitive strain strength.

TABLE 2

|  |  |  | Example 8 | Example 9 | Example 10 | Example 11 | Example 12 | Example 13 | Example 14 |
|---|---|---|---|---|---|---|---|---|---|
|  | Modified diene-based polymer (sample No.) |  | 1 | 2 | 3 | 4 | 5 | 6 | 7 |
|  | (Physical property 5) Mooney viscosity of modified diene-based polymer (100° C.) |  | 82 | 85 | 80 | 79 | 100 | 52 | 62 |
|  | (Evaluation 1) Mooney viscosity of compound (130° C.) | Index | 90 | 93 | 91 | 94 | 97 | 81 | 99 |
| Physical properties of vulcanizate | (Evaluation 2) 50° C. tanδ (strain 3%) | Index | 82 | 85 | 84 | 84 | 88 | 80 | 80 |
|  | (Evaluation 2) 0° C. tanδ (strain 1%) | Index | 115 | 115 | 113 | 116 | 110 | 119 | 118 |
|  | (Evaluation 2) Strain dispersibility (50° C. tanδ) | Index | 85 | 87 | 87 | 84 | 90 | 83 | 83 |
|  | (Evaluation 3) Tensile strength | Index | 100 | 103 | 102 | 99 | 111 | 97 | 95 |
|  | (Evaluation 3) Tensile elongation | Index | 98 | 99 | 99 | 97 | 112 | 97 | 96 |
|  | (Evaluation 4) Abrasion resistance | Index | 118 | 115 | 116 | 117 | 121 | 108 | 103 |
|  | (Evaluation 5) Repetitive strain strength | Index | 117 | 114 | 115 | 115 | 119 | 110 | 108 |

|  |  |  | Example 17 | Example 18 | Comparative Example 4 | Comparative Example 5 | Comparative Example 6 | Comparative Example 8 |
|---|---|---|---|---|---|---|---|---|
|  | Modified diene-based polymer (sample No.) |  | 11 | 12 | 8 | 9 | 10 | 13 |
|  | (Physical property 5) Mooney viscosity of modified diene-based polymer (100° C.) |  | 93 | 64 | 56 | 85 | 84 | 85 |
|  | (Evaluation 1) Mooney viscosity of compound (130° C.) | Index | 95 | 98 | 83 | 100 | 95 | 96 |
| Physical properties of vulcanizate | (Evaluation 2) 50° C. tanδ (strain 3%) | Index | 86 | 91 | 98 | 100 | 90 | 93 |
|  | (Evaluation 2) 0° C. tanδ (strain 1%) | Index | 110 | 105 | 95 | 100 | 92 | 105 |
|  | (Evaluation 2) Strain dispersibility (50° C. tanδ) | Index | 91 | 93 | 101 | 100 | 97 | 95 |
|  | (Evaluation 3) Tensile strength | Index | 105 | 96 | 85 | 100 | 97 | 98 |
|  | (Evaluation 3) Tensile elongation | Index | 100 | 98 | 89 | 100 | 95 | 97 |
|  | (Evaluation 4) Abrasion resistance | Index | 113 | 100 | 91 | 100 | 105 | 106 |
|  | (Evaluation 5) Repetitive strain strength | Index | 113 | 101 | 93 | 100 | 104 | 105 |

As shown in Table 2, it was confirmed that the modified conjugated diene-based copolymer compositions obtained using samples 1 to 7, 11 and 12 in Examples 8 to 14, 17 and 18 are much superior in processability when used for obtaining a vulcanizate, to the modified conjugated diene-based polymer compositions obtained using samples 8 to 10 and 13 in Comparative Examples 4 to 6 and 8. Besides, it was confirmed that, particularly, the balance between the low hysteresis loss property and the wet skid resistance obtained when in the form of a vulcanizate is excellent, the abrasion resistance is good, the strain dispersibility is also good, and even practically sufficient fracture characteristics are attained.

This application is based upon the prior Japanese patent application (Japanese Patent Application No. 2016-161490), filed to the Japanese Patent Office on Aug. 19, 2016, the entire contents of which are incorporated herein by reference.

INDUSTRIAL APPLICABILITY

A modified conjugated diene-based polymer according to the present invention is industrially applicable in the fields of tire treads, vehicle interiors and exteriors, anti-vibration rubbers, belts, shoes, foams and various industrial products.

The invention claimed is:

1. A modified conjugated diene-based polymer having a nitrogen atom, wherein
   a content of the nitrogen atom is 25 mass ppm or more based on a total amount of the modified conjugated diene-based polymer,
   a shrinking factor (g') is 0.59 or less in a GPC-light scattering measurement method with a viscosity detector,
   a weight average molecular weight is 200,000 or more and 3,000,000 or less, and
   a branching degree is 8 or more.

2. The modified conjugated diene-based polymer according to claim 1, wherein a Mooney stress relaxation measured at 110° C. is 0.45 or less.

3. The modified conjugated diene-based polymer according to claim 2, wherein a modification ratio is 75% by mass or more based on a total amount of a conjugated diene-based polymer and a branching degree is 8 or more.

4. The modified conjugated diene-based polymer according to claim 3, represented by the following general formula (I):

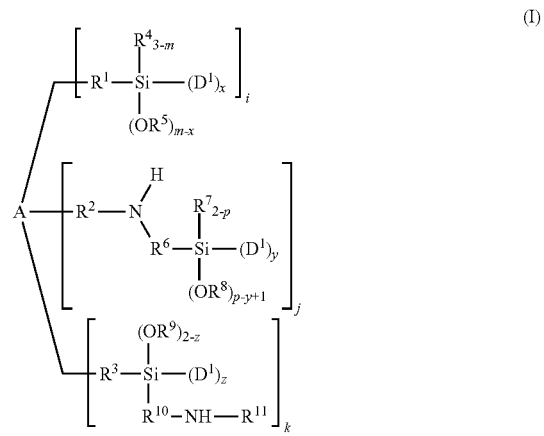

wherein $D^1$ represents a conjugated diene-based polymer chain having a nitrogen atom; $R^1$ to $R^3$ each independently represent a single bond or an alkylene group having 1 to 20 carbon atoms; $R^4$ and $R^7$ each independently represent an alkyl group having 1 to 20 carbon atoms; $R^5$, $R^8$ and $R^9$ each independently represent a hydrogen atom or an alkyl group having 1 to 20 carbon atoms; $R^6$ and $R^{10}$ each independently represent an alkylene group having 1 to 20 carbon atoms; $R^{11}$ represents a hydrogen atom or an alkyl group having 1 to 20 carbon atoms; m and x each independently represent an integer of 1 to 3 as long as being x≤m; p represents 1 or 2; y represents an integer of 1 to 3, and y≤(p+1); z represents an integer of 1 or 2; each of $D^1$, $R^1$ to $R^{11}$, m, p, x, y and z, if present in a plural number, is respectively independent and may be the same as or different from each other as long as satisfying x≤m and y≤(p+1); i represents an integer of 0 to 6; j represents an integer of 0 to 6; k represents an integer of 0 to 6; (i+j+k) is an integer of 4 to 10; ((x×i)+(y×j)+(z×k)) is an integer of 8 to 30; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having an active hydrogen wherein A in the formula (I) is represented by any one of the following general formulae (II) to (V):

(II)

wherein $B^1$ represents a single bond or a hydrocarbon group having 1 to 20 carbon atoms; a represents an integer of 1 to 10; and $B^1$, if present in a plural number, is respectively independent;

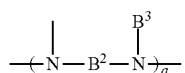
(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

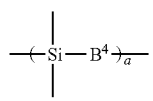
(IV)

wherein $B^4$ represents a single bond or a hydrocarbon group having 1 to 20 carbon atoms; a represents an integer of 1 to 10; and $B^4$, if present in a plural number, is respectively independent; and

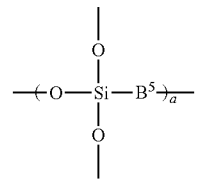
(V)

wherein $B^5$ represents a single bond or a hydrocarbon group having 1 to 20 carbon atoms; a represents an integer of 1 to 10; $B^5$, if present in a plural number, is respectively independent.

5. A method for producing the modified conjugated diene-based polymer according to claim 3, comprising:

a polymerization step of polymerizing at least a conjugated diene compound in the presence of an organolithium compound having at least one nitrogen atom in a molecule, or copolymerizing at least a conjugated diene compound and a copolymerizable monomer having at least one nitrogen atom in a molecule in the presence of an organolithium compound to give a nitrogen-containing conjugated diene-based polymer; and a modification step of modifying the nitrogen-containing conjugated diene-based polymer with a modifier having at least three silicon atoms and at least one nitrogen atom in one molecule and 8 or more reaction active sites.

6. A tire comprising a rubber composition comprising a rubber component and a filler in an amount of 5.0 parts by mass or more and 150 parts by mass or less based on 100 parts by mass of the rubber component, wherein the rubber component comprises the modified conjugated diene-based polymer according to claim 3 in an amount of 10% by mass or more based on a total amount of the rubber component.

7. The modified conjugated diene-based polymer according to claim 1, wherein a modification ratio is 75% by mass or more based on a total amount of a conjugated diene-based polymer.

8. The modified conjugated diene-based polymer according to claim 1, wherein a plurality of conjugated diene-based polymer chains are bonded to a modifier, and the modified conjugated diene-based polymer has a nitrogen atom in at least one of the conjugated diene-based polymer chains and has a silicon atom in a modifier residue.

9. The modified conjugated diene-based polymer according to claim 1, represented by the following general formula (I):

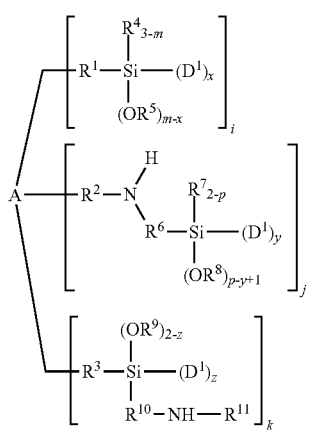

wherein $D^1$ represents a conjugated diene-based polymer chain having a nitrogen atom; $R^1$ to $R^3$ each independently represent a single bond or an alkylene group having 1 to 20 carbon atoms; $R^4$ and $R^7$ each independently represent an alkyl group having 1 to 20 carbon atoms; $R^5$, $R^8$ and $R^9$ each independently represent a hydrogen atom or an alkyl group having 1 to 20 carbon atoms; $R^6$ and $R^{10}$ each independently represent an alkylene group having 1 to 20 carbon atoms; $R^{11}$ represents a hydrogen atom or an alkyl group having 1 to 20 carbon atoms; m and x each independently represent an integer of 1 to 3 as long as being x≤m; p represents 1 or 2; y represents an integer of 1 to 3, and y≤(p+1); z represents an integer of 1 or 2; each of $D^1$, $R^1$ to $R^{11}$, m, p, x, y and z, if present in a plural number, is respectively independent and may be the same as or different from each other as long as satisfying x≤m and y≤(p+1); i represents an integer of 0 to 6; j represents an integer of 0 to 6; k represents an integer of 0 to 6; (i+j+k) is an integer of 4 to 10; ((x×i)+(y×j)+(z×k)) is an integer of 8 to 30; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having an active hydrogen.

10. The modified conjugated diene-based polymer according to claim 9, wherein A in the formula (I) is represented by any one of the following general formulae (II) to (V):

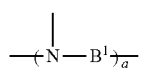 (II)

wherein $B^1$ represents a single bond or a hydrocarbon group having 1 to 20 carbon atoms; a represents an integer of 1 to 10; and $B^1$, if present in a plural number, is respectively independent;

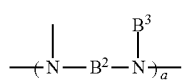 (III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

 (IV)

wherein $B^4$ represents a single bond or a hydrocarbon group having 1 to 20 carbon atoms; a represents an integer of 1 to 10; and $B^4$, if present in a plural number, is respectively independent; and

 (V)

wherein $B^5$ represents a single bond or a hydrocarbon group having 1 to 20 carbon atoms; a represents an integer of 1 to 10; $B^5$, if present in a plural number, is respectively independent.

11. A method for producing the modified conjugated diene-based polymer according to claim 1, comprising:

a polymerization step of polymerizing at least a conjugated diene compound in the presence of an organolithium compound having at least one nitrogen atom in a molecule, or copolymerizing at least a conjugated diene compound and a copolymerizable monomer having at least one nitrogen atom in a molecule in the presence of an organolithium compound to give a nitrogen-containing conjugated diene-based polymer; and a modification step of modifying the nitrogen-containing conjugated diene-based polymer with a modifier having at least three silicon atoms and at least one nitrogen atom in one molecule and 8 or more reaction active sites.

12. The method for producing the modified conjugated diene-based polymer according to claim 11, wherein the modifier is a modifier having 4 or more alkoxy groups bonded to silicon atoms and having a tertiary amino group.

13. The method for producing the modified conjugated diene-based polymer according to claim 12, wherein the modifier in the reaction step is a compound represented by the following general formula (VI):

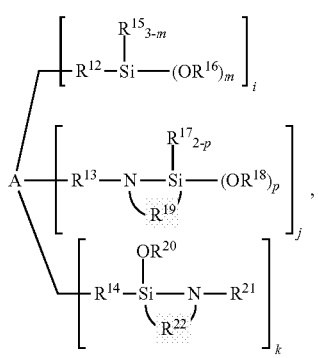

(VI)

wherein $R^{12}$ to $R^{14}$ each independently represent a single bond or an alkylene group having 1 to 20 carbon atoms; $R^{15}$ to $R^{18}$ and $R^{20}$ each independently represent an alkyl group having 1 to 20 carbon atoms; $R^{19}$ and $R^{22}$ each independently represent an alkylene group having 1 to 20 carbon atoms; $R^{21}$ represents an alkyl group having 1 to 20 carbon atoms or a trialkylsilyl group; m represents an integer of 1 to 3; p represents 1 or 2; each of $R^{12}$ to $R^{22}$, m and p, if present in a plural number, is respectively independent, and may be the same as or different from each other; i represents an integer of 0 to 6, j represents an integer of 0 to 6, k represents an integer of 0 to 6, and (i+j+k) is an integer of 4 to 10; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having an active hydrogen.

14. The method for producing the modified conjugated diene-based polymer according to claim 13, wherein A in the formula (VI) is represented by any one of the following general formulae (II) to (V):

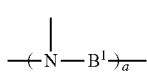

(II)

wherein $B^1$ represents a single bond or a hydrocarbon group having 1 to 20 carbon atoms; a represents an integer of 1 to 10; and $B^1$, if present in a plural number, is respectively independent;

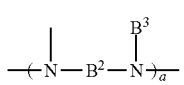

(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

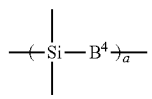

(IV)

wherein $B^4$ represents a single bond or a hydrocarbon group having 1 to 20 carbon atoms; a represents an integer of 1 to 10; and $B^4$, if present in a plural number, is respectively independent; and

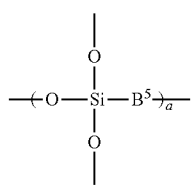

(V)

wherein $B^5$ represents a single bond or a hydrocarbon group having 1 to 20 carbon atoms; a represents an integer of 1 to 10; and $B^5$, if present in a plural number, is respectively independent.

15. The method for producing the modified conjugated diene-based polymer according to claim 11, wherein the organolithium compound having at least one nitrogen atom in a molecule comprises an organolithium compound represented by any of the following general formulae (1) to (5):

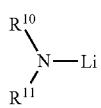

(1)

wherein $R^{10}$ and $R^{11}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{10}$ and $R^{11}$ are optionally bonded to each other to form a cyclic structure together with the adjacent nitrogen atom, wherein $R^{10}$ and $R^{11}$ represents an alkyl group having 5 to 12 carbon atoms and optionally has an unsaturated bond or a branched structure in a part thereof; and the protective group is an alkyl-substituted silyl group,

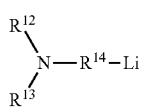

(2)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; and $R^{14}$ represents an alkylene group optionally having an aliphatic or aromatic substituent having 1 to 30 carbon atoms, or a conjugated diene-based polymer having 1 to 20 carbon atoms,

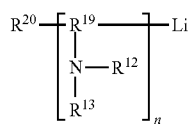

(3)

wherein $R^{12}$ and $R^{13}$ each independently represent at least one group selected from the group consisting of an alkyl group having 1 to 12 carbon atoms, a cycloalkyl group having 3 to 14 carbon atoms, an aralkyl group having 6 to 20 carbon atoms, and a protective group, or $R^{12}$ and $R^{13}$ are optionally bonded to each other to form a cyclic structure together with the adjacent nitrogen atom, wherein $R^{12}$ and $R^{13}$ represents an alkyl group having 5 to 12 carbon atoms and optionally has an unsaturated bond or a branched structure in a part thereof; the protective group is an alkyl-substituted silyl group; $R^{19}$ represents a hydrocarbon group optionally having an aliphatic or aromatic substituent having 1 to 30 carbon atoms; $R^{20}$ represents a hydrocarbon group optionally having a substituted amino group having 1 to 12 carbon atoms; and n represents an integer of 1 to 10,

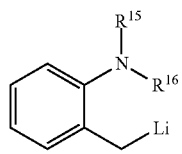

(4)

wherein $R^{15}$ and $R^{16}$ each independently represent at least one group selected from the group consisting of an alkyl group having 1 to 12 carbon atoms, a cycloalkyl group having 3 to 14 carbon atoms, an aryl group having 6 to 20 carbon atoms, and a protective group, or $R^{15}$ and $R^{16}$ are optionally bonded to each other to form a cyclic structure together with the adjacent nitrogen atom, wherein $R^{15}$ and $R^{16}$ represents an alkyl group having 5 to 12 carbon atoms and optionally has a branched structure in a part thereof; and the protective group is an alkyl-substituted silyl group, and

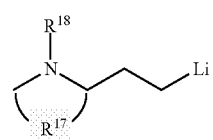

(5)

wherein $R^{17}$ represents a hydrocarbon group having 2 to 10 carbon atoms and optionally has an unsaturated bond or a branched structure in a part thereof; $R^{18}$ represents an alkyl group having 1 to 12 carbon atoms or a protective group and optionally has a branched structure in a part thereof; and the protective group is an alkyl-substituted silyl group.

16. An oil-extended modified conjugated diene-based polymer comprising:
100 parts by mass of the modified conjugated diene-based polymer according to claim 1; and
1 to 60 parts by mass of an extender oil.

17. A rubber composition, comprising a rubber component and a filler in an amount of 5.0 parts by mass or more and 150 parts by mass or less based on 100 parts by mass of the rubber component,
wherein the rubber component comprises the modified conjugated diene-based polymer according to claim 1 in an amount of 10% by mass or more based on a total amount of the rubber component.

18. A tire comprising the rubber composition according to claim 17.

* * * * *